(12) United States Patent
Kim

(10) Patent No.: US 11,934,976 B2
(45) Date of Patent: Mar. 19, 2024

(54) METHOD, DEVICE AND PROGRAM FOR CONTROLLING SPECIALIST PLATFORM

(71) Applicant: ENTERLAB INC., Seoul (KR)

(72) Inventor: Bo Eon Kim, Seoul (KR)

(73) Assignee: ENTERLAB INC., Seoul (KR)

( * ) Notice: Subject to any disclaimer, the term of this patent is extended or adjusted under 35 U.S.C. 154(b) by 302 days.

(21) Appl. No.: 17/050,192

(22) PCT Filed: Aug. 14, 2019

(86) PCT No.: PCT/KR2019/010399
§ 371 (c)(1),
(2) Date: Oct. 23, 2020

(87) PCT Pub. No.: WO2020/040482
PCT Pub. Date: Feb. 27, 2020

(65) Prior Publication Data
US 2021/0365867 A1 Nov. 25, 2021

(30) Foreign Application Priority Data

Aug. 24, 2018 (KR) .................. 10-2018-0099502
Aug. 28, 2018 (KR) .................. 10-2018-0101499
Jun. 13, 2019 (KR) .................. 10-2019-0070305

(51) Int. Cl.
*G06Q 10/0631* (2023.01)
*G06Q 10/0639* (2023.01)
(Continued)

(52) U.S. Cl.
CPC .............. *G06Q 10/063112* (2013.01); *G06Q 10/06398* (2013.01); *G06F 18/22* (2023.01); *G06V 10/762* (2022.01)

(58) Field of Classification Search
CPC .............. G06Q 10/06; G06Q 10/0631; G06Q 10/1053; G06Q 10/063112; G06Q 10/06398
See application file for complete search history.

(56) References Cited

U.S. PATENT DOCUMENTS 11,036,938 B2 * 6/2021 Alexander ............ G06F 16/951
2007/0185757 A1 * 8/2007 Subramanian ......... G06Q 30/08
705/7.32

(Continued)

FOREIGN PATENT DOCUMENTS

KR    10-0849434 B1    7/2008
KR    10-1470514 B1    12/2014
(Continued)

*Primary Examiner* — Johnna R Loftis
(74) *Attorney, Agent, or Firm* — Goldilocks Zone IP Law

(57) ABSTRACT

A method by which a server performs specialist platform control is provided. In order to resolve the aforementioned problem, the control method comprises the steps of: registering the specialist; acquiring specialist information of the registered specialist; computing career information of the specialist on the basis of the acquired specialist information; matching a project corresponding to the specialist on the basis of the career information of the specialist; acquiring project data computed according to the project performance result when the matching project is performed by the specialist; and updating the career information of the specialist on the basis of the project data.

6 Claims, 14 Drawing Sheets

(51) Int. Cl.
*G06F 18/22* (2023.01)
*G06V 10/762* (2022.01)

(56) References Cited

U.S. PATENT DOCUMENTS

| | | | | |
|---|---|---|---|---|
| 2008/0109267 A1* | 5/2008 | DeLosa | ................ | G06Q 10/06 |
| | | | | 705/7.29 |
| 2009/0070316 A1* | 3/2009 | Beauchesne | ........ | G06F 16/9535 |
| | | | | 707/999.005 |
| 2009/0083221 A1* | 3/2009 | Pingali | ............ | G06Q 10/06398 |
| 2009/0234686 A1* | 9/2009 | Chakra | ............... | G06Q 50/265 |
| | | | | 705/325 |
| 2014/0108308 A1* | 4/2014 | Stout | ................. | G06Q 30/0241 |
| | | | | 706/20 |
| 2014/0324721 A1* | 10/2014 | Rennison | ........... | G06Q 50/2057 |
| | | | | 705/321 |
| 2015/0100360 A1* | 4/2015 | Seshadri | ........ | G06Q 10/063118 |
| | | | | 705/7.14 |
| 2015/0135043 A1* | 5/2015 | Apps | ...................... | G06Q 10/06 |
| | | | | 715/202 |
| 2015/0347950 A1* | 12/2015 | Goyal | .............. | G06Q 10/06393 |
| | | | | 705/7.39 |
| 2016/0171404 A1* | 6/2016 | Mukherjee | ....... | G06Q 10/06313 |
| | | | | 705/7.14 |
| 2017/0316470 A1* | 11/2017 | Proctor | ............. | G06Q 30/0284 |
| 2018/0174250 A1* | 6/2018 | Faulkner | ............... | G06F 3/0483 |
| 2018/0189706 A1* | 7/2018 | Newhouse | ........... | G06Q 10/101 |

FOREIGN PATENT DOCUMENTS

| | | |
|---|---|---|
| KR | 10-2015-0125614 A | 11/2015 |
| KR | 10-1851453 A | 4/2018 |
| KR | 10-2019-0118301 A | 10/2019 |

\* cited by examiner

METHOD, DEVICE AND PROGRAM FOR CONTROLLING SPECIALIST PLATFORM

CROSS-REFERENCE TO RELATED APPLICATIONS

This application claims the benefit under 35 U.S.C. section 371, of PCT International Application No.: PCT/KR2019/010399, filed on Aug. 14, 2019, which claims foreign priority to Korean Patent Application No.: 10-2018-0099502, filed on Aug. 24, 2018, No.: 10-2018-0101499, filed on Aug. 28, 2018 and No.: 10-2019-0070305, filed on Jun. 13, 2019, in the Korean Intellectual Property Office, both of which are hereby incorporated by reference in their entireties.

TECHNICAL FIELD

The present invention relates to a method, device, and program for controlling a specialist platform.

BACKGROUND ART

In the era of the 4th industrial revolution, it is expected that the depth, speed, and scope will be greatly expanded based on super-connectivity and superintelligence. Accordingly, not only various industrial fields arise, but also a number of new fields are created through the fusion of existing and new industrial fields, and it is expected that there will be no or very few specialists in the corresponding field. Therefore, there is a need for a platform where specialists in each field may be found and recruited, and where specialists in each field may cooperate.

Further, a period of production activities will be extended due to the extended life expectancy in the future, and it is necessary for each specialist to make the corresponding field a lifelong "business" rather than simply a job.

Further, it is desirable for specialists to be able to act and be treated based on their ability in each field, but because an organization such as an existing company pursues equity among employees and stability of the entire organization, it is difficult to preserve the individuality of each specialist and there were problems such as being unable to be given treatment according to an ability, and becoming a manager rather than using it as careers accumulate.

Therefore, it is necessary to ensure the autonomy of specialists based on the Gig economy, draw maximum efficiency, and ensure minimum stability and sustainability.

A blockchain is referred to as a public transaction ledger and is technology that prevents hacking that may occur when trading with a virtual currency. Existing financial companies store transaction records in a centralized server, whereas the blockchain has a decentralized feature that uses a method of preventing data forgery by sending transaction details to all users participating in the transaction, and comparing the transaction details in each transaction.

For example, the blockchain is applied to bitcoin, which is a representative online virtual currency. The bitcoin transparently records transaction details in a ledger in which anyone can read, and several computers using the Bitcoin verify the record every 10 minutes to prevent hacking. Recently, various coins have been developed and provided to solve the shortcomings of the bitcoin, and various tokens are functioning as a virtual currency with the advent of coins with platform-like functions.

Further, as various distributed applications (DAPP) using a virtual currency platform are developed and used, the utilization of the blockchain is increasing.

Furthermore, various information such as detailed information, work experience, a specialty field, and project execution experience of specialists managed in a specialist platform are at risk of hacking and forgery, and when information leaked through hacking is used in the market, confidence in the specialist platform for specialist management may be damaged and the degree of matching may decrease.

Accordingly, there is a demand for development of technology capable of preventing forgery and falsification while maintaining the reliability of such information.

MICE is an acronym of English such as a meeting, incentive trip, convention, exhibition & event, and in a narrow sense, the MICE means a promising industry centered on international conferences and exhibitions, and in a broader concept, the MICE means a convergence industry including mega events and reward tourism centered on participants.

DISCLOSURE

Technical Problem

The problem to be solved by the present invention is to provide a method, device, and program for controlling a specialist platform.

The problems to be solved by the present invention are not limited to the problems described above, and other problems that are not described will be clearly understood by those skilled in the art from the following description.

Technical Solution

A method of controlling a specialist platform according to an aspect of the present invention for solving the above problems includes registering the specialist; obtaining specialist information of the registered specialist; calculating career information of the specialist based on the obtained specialist information; matching a project corresponding to the specialist based on career information of the specialist; obtaining project data calculated according to an execution result of the project when the matched project is executed by the specialist; and updating the career information of the specialist based on the project data.

Advantageous Effects

According to the disclosed embodiment, by verifying a specialist and calculating the specialist's career information, a specialist platform operated by a server can manage the specialist's career, and project data can be converted into information and data so that the project data can be practically used in industrial sites by managing the project data generated by specialists.

Further, according to the disclosed embodiment, by constructing a system capable of distributing profits according to project execution by specialists, a reasonable profit distribution model can be created according to the project provision of the specialist platform.

Further, information about specialists can be securely protected based on blockchain technology, which can contribute to securing the reliability of the specialist platform and enhancing the degree of matching.

The effects of the present invention are not limited to the effects described above, and other effects that are not described will be clearly understood by those skilled in the art from the following description.

BEST MODE

Figure 1:
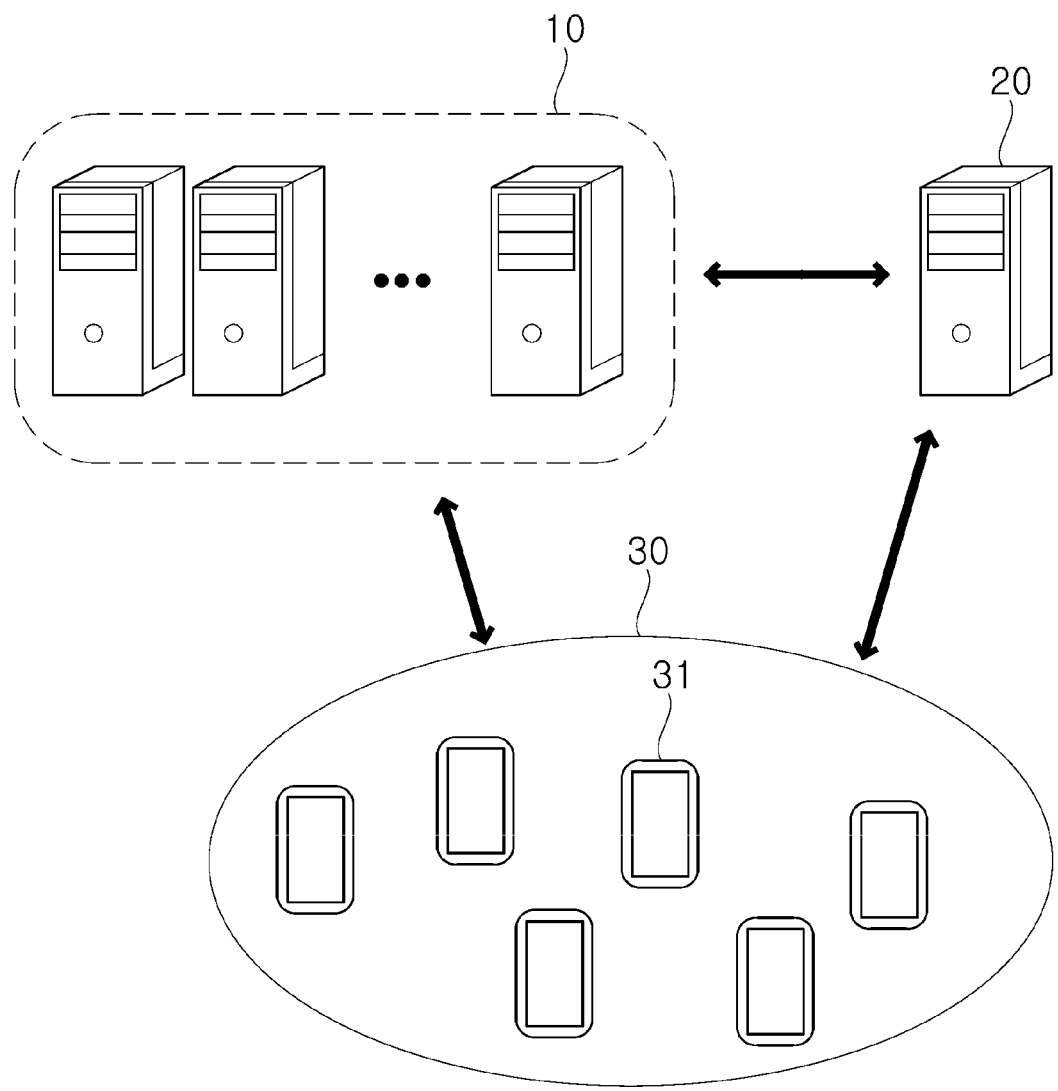
FIG. 1 is a diagram illustrating a blockchain system according to an embodiment of the present invention.

A method of controlling a specialist platform according to an aspect of the present invention for solving the above problems includes registering the specialist; obtaining specialist information of the registered specialist; calculating career information of the specialist based on the obtained specialist information; matching a project corresponding to the specialist based on career information of the specialist; obtaining project data calculated according to an execution result of the project when the matched project is executed by the specialist; and updating the career information of the specialist based on the project data.

Other specific details of the present invention are included in the detailed description and drawings.

Mode for Invention

The advantages and features of the present invention and a method of achieving them will become apparent with reference to the embodiments described in detail below together with the accompanying drawings. However, the present invention is not limited to the embodiments disclosed below, but may be implemented in various different forms, and the present embodiments are provided only to make the disclosure of the present invention complete, and to fully inform the scope of the present invention to those skilled in the art to which the present invention belongs, and the present invention is only defined by the scope of the claims.

Terms used in the present specification are not to limit the present invention but to illustrate embodiments. In the present specification, the singular form also includes the plural form unless specifically stated in the phrase. As used in the specification, "comprises" and/or "comprising" do not exclude the presence or addition of one or more other elements other than the described elements. Throughout the specification, the same reference numerals refer to the same elements, and "and/or" includes each and all combinations of one or more of the described elements. Although "first", "second", and the like are used for describing various elements, but these elements are not limited by these terms. These terms are used for only distinguishing one element from another element. Therefore, a first element described below may be a second element within the scope of the present invention.

Unless otherwise defined, all terms (including technical and scientific terms) used in the present specification may be used as meanings that can be commonly understood by those of ordinary skill in the art to which the present invention belongs. Further, terms defined in a commonly used dictionary are not interpreted ideally or excessively unless explicitly defined specifically.

The term "unit" or "module" used in the specification means a hardware element such as software, FPGA or ASIC, and the "unit" or "module" performs certain roles. However, "unit" or "module" is not meant to be limited to software or hardware. The "unit" or "module" may be configured to be in an addressable storage medium or may be configured to reproduce one or more processors. Therefore, "unit" or "module" includes, for example, components such as software components, object-oriented software components, class components, and task components, processes, functions, attributes, procedures, subroutines, segments of a program code, drivers, firmware, microcode, circuit, data, database, data structures, tables, arrays, and variables. A function provided within components and "unit" or "module" may be performed by coupling the smaller number of components and "unit" or "module" or by subdividing the components and "unit" or "module" into additional components and "unit" or "module".

Spatially relative terms "below", "beneath", "lower", "above", "upper", etc., may be used for easily describing the correlation between a component and other components, as illustrated in the drawing. Spatially relative terms should be understood as terms including different directions of components during use or operation in addition to the directions illustrated in the drawings. For example, when a component illustrated in the drawing is turned over, a component described as "below" or "beneath" of another component may be placed "above" the other component. Accordingly, the exemplary term "below" may include both directions below and above. Components may be oriented in other directions, and thus spatially relative terms may be interpreted according to orientation.

In the present specification, a computer means all kinds of hardware devices including at least one processor, and may be understood as encompassing a software configuration operating in the corresponding hardware device according to embodiments. For example, the computer may be understood as including all of a smartphone, a tablet PC, a desktop PC, a laptop PC, and a user client and an application running in each device, but it is not limited thereto.

In the present specification, a business and project executing entity may be understood as encompassing not only a business entity such as an individual business entity or a corporation, but also a general individual, and does not limit a specific target. In an embodiment, the business and project subject, and the execution subject may be the government, local governments, public institutions, cooperative organizations, and the like.

In the present specification, the term "project" or "project information" may mean businesses and projects ordered by the government, local governments, public institutions, associations, businesses and projects ordered by companies, business and project-related works, domestic and international procurement bidding, and various projects and business related works requiring specialists.

A type of a project may include various types such as providing of products and services, and is not limited to a specific type. For example, a project may be for supplying a specific product, may be for providing a research service or a professional business service, etc., or may be a combination of various tasks.

In the present specification, a specialist may be understood to mean all kinds of people with a predetermined specialty in a specific field, and criteria thereof are not limited. All kinds of experienced persons, educated persons, or talented persons capable of performing a work in a specific field may all be referred to as specialists, but the specialist may be preferably understood to mean a person with a predetermined career in a specific field.

Accordingly, specialists according to the present disclosure may mean specialists who meet the requirements required by a specific group as well as specialists of the existing conceptual, common, and general criteria.

The term "specialist" in the present disclosure means a single individual specialist, but is not limited thereto. That is, a specific group itself may be regarded as the specialist.

Further, a specialist in the present disclosure may mean a freelancer who intends to perform a part-time work or an outsourcing work.

In the present specification, MICE is an acronym of English such as a meeting, incentive trip, convention, exhibition & event, and in a narrow sense, the MICE means a promising industry centered on international conferences and exhibitions, and in a broader concept, the MICE means a convergence industry including mega events and reward tourism centered on participants. However, the meaning of MICE in the present specification is not limited to the term itself, and may be used in various terms depending on time and region.

For example, in Canada, Meeting, Convention and Incentive Travel is used as MC&IT, in the United States, ME&I or MEEC (Meetings, Expositions, Events and Conventions) is used, and in Singapore, Business Travel & MICE is used as BT MICE, i.e., various terms are used according to an industrial structure and policy of each country.

Hereinafter, embodiments of the present invention will be described in detail with reference to the accompanying drawings.

Each of steps described in the present specification is described as being performed by a computer or a server, but the subject of each step is not limited thereto, and at least some of each step may be performed by different devices according to embodiments.

Referring to FIG. 1, blockchain holding servers 10, a management server 20, and user terminals 30 are illustrated.

In the disclosed embodiment, each of the user terminals 30 records transaction details based on a preset rule, and the recorded transaction details are recorded in each block and propagated to the blockchain holding servers 10, and stored and managed in each server.

In the disclosed embodiment, the blockchain holding servers 10 mean servers equipped with a blockchain for authenticating and recording transaction information. In an embodiment, transaction information may mean transaction information based on a virtual currency, but may mean information on various events performed based on the blockchain, and such transaction information is stored in the blockchain.

A virtual currency according to the disclosed embodiment is understood as a concept that collectively refers to all kinds of non-real money whose transaction details are managed through a blockchain such as electronic money and cryptocurrency.

For the virtual currency according to the disclosed embodiment, a separate main net is constructed, and the virtual currency may be a virtual currency in the form of a coin managed accordingly and may be a virtual currency in the form of a token that utilizes an infrastructure of other coins such as an Ethereum network, but is not limited thereto.

In an embodiment, the virtual currency provided to each of the user terminals 30 is managed by the management server 20 in an already generated or issued state, and may be provided according to the transaction details of each of the user terminals 30.

For example, the management server 20 may perform an operation for generating a block for storing transaction details occurring between the user terminals 30 and generate a block through proof of work. According to an embodiment, the management server 20 may receive a predetermined virtual currency generated in return and distribute the virtual currency to the user terminals 30 according to the transaction details of the user terminals 30.

In an embodiment, as transaction details are recorded by each of the user terminals 30, a virtual currency may be generated according to a preset rule and provided to the user terminals 30, and this is expressed as the mining of a virtual currency.

In general, the mining of a virtual currency is carried out by one method of Proof Of Work (POW), Proof Of Stake (POS), and Proof Of Importance (POI). The above-described methods are one of distributed summation algorithms used for guaranteeing the reliability of a distributed system.

In the disclosed embodiment, a transaction between user terminals 30 and a method of providing a virtual currency accordingly are performed by a smart contract.

Figure 2:
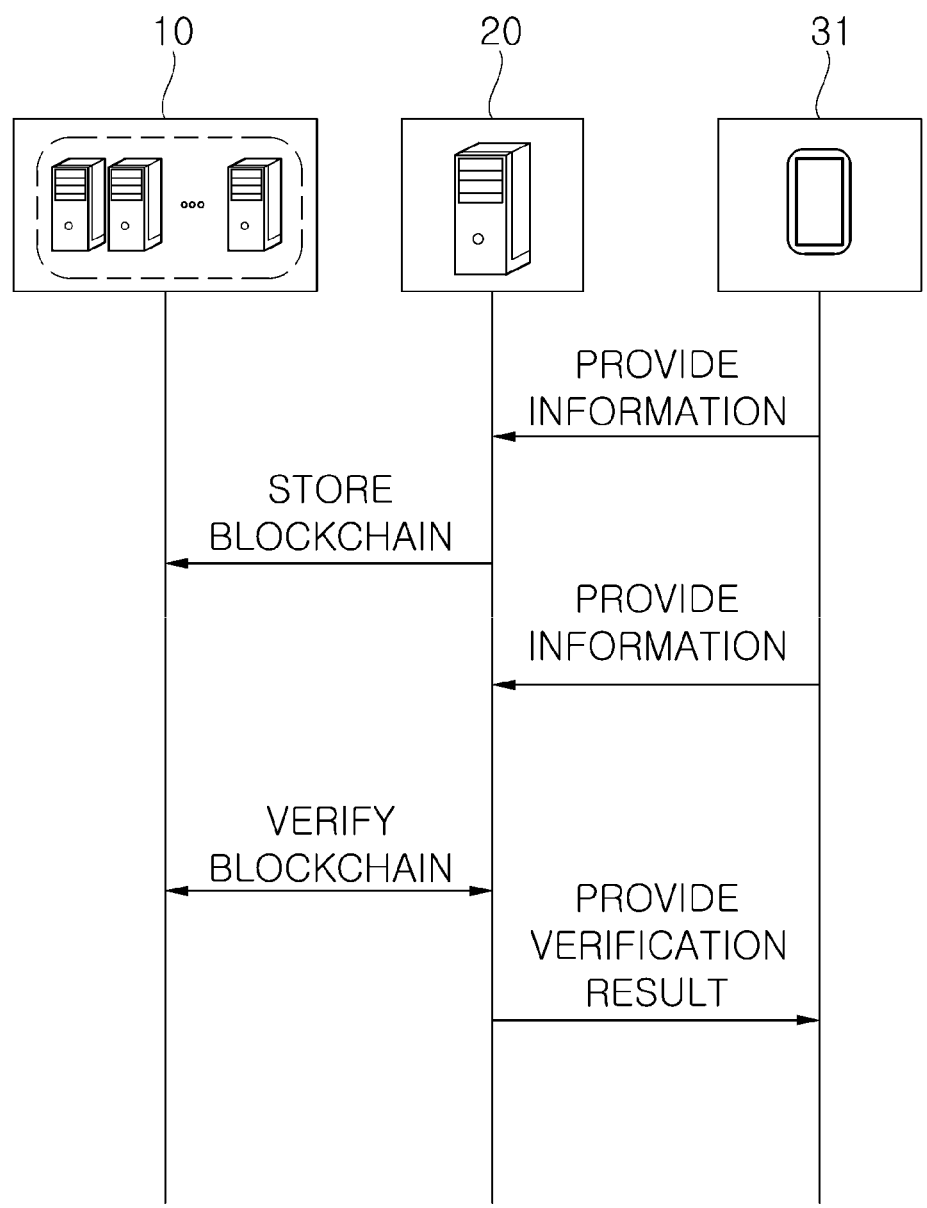
FIG. 2 is a diagram illustrating an operation of a blockchain system according to an embodiment of the present invention.

FIG. 2 is a diagram illustrating an operation of a blockchain system according to an embodiment of the present invention.

Referring to FIG. 2, operations of the blockchain holding servers 10, the management server 20, and a user terminal 31 illustrated in FIG. 1 are illustrated.

The management server 20 illustrated in FIG. 2 may mean a server of a communication company in which the user terminal 31 uses to communicate with the blockchain holding servers 10, a local server connected to the user terminal 31, or a server that manages a blockchain-based service in which the user terminal 31 uses, but the management server 20 may be omitted, and the user terminal 31 may directly communicate with the blockchain holding servers 10 to construct a complete decentralization system.

FIG. 2 illustrates an example of a configuration used in a general blockchain-based service, and the form of a system using blockchain technology is not limited thereto.

In an embodiment, the user terminal 31 provides information to the management server 20, and when the information is information to be stored in the blockchain, the management server 20 may provide the information to the blockchain holding servers 10. The blockchain holding servers 10 may store the corresponding information in the blockchain, and in this process, verification of the information based on the blockchain may be performed. In this case, only information that has been successfully verified may be recorded in the blockchain.

Further, when there is information requiring verification, the user terminal 31 may provide the information to the management server 20. In this case, the management server 20 may verify this based on the information stored in the blockchain, and in this process, the management server 20 may obtain information for verifying the information from the blockchain holding servers 10 and accordingly, the management server 20 may perform verification. The management server 20 may provide the verification result to the user terminal 31 or provide a service to the user terminal 31 based on the verification result.

Unlike the existing centralized server-based system, the blockchain system provides higher security by providing a decentralized distributed processing system and has the advantage of providing reliability that cannot be manipulated by a specific subject.

Further, in recent years, because the blockchain system functions as a platform that may provide various blockchain-based applications, utilization thereof is expected to increase further.

Each of steps described in the present specification is described as being performed by a server, but the subject of each step is not limited thereto, and at least some of each step may be performed by different devices according to embodiments. For example, each of the steps described in the present specification may be performed by a computer, a cloud server, or the like.

Figure 3:
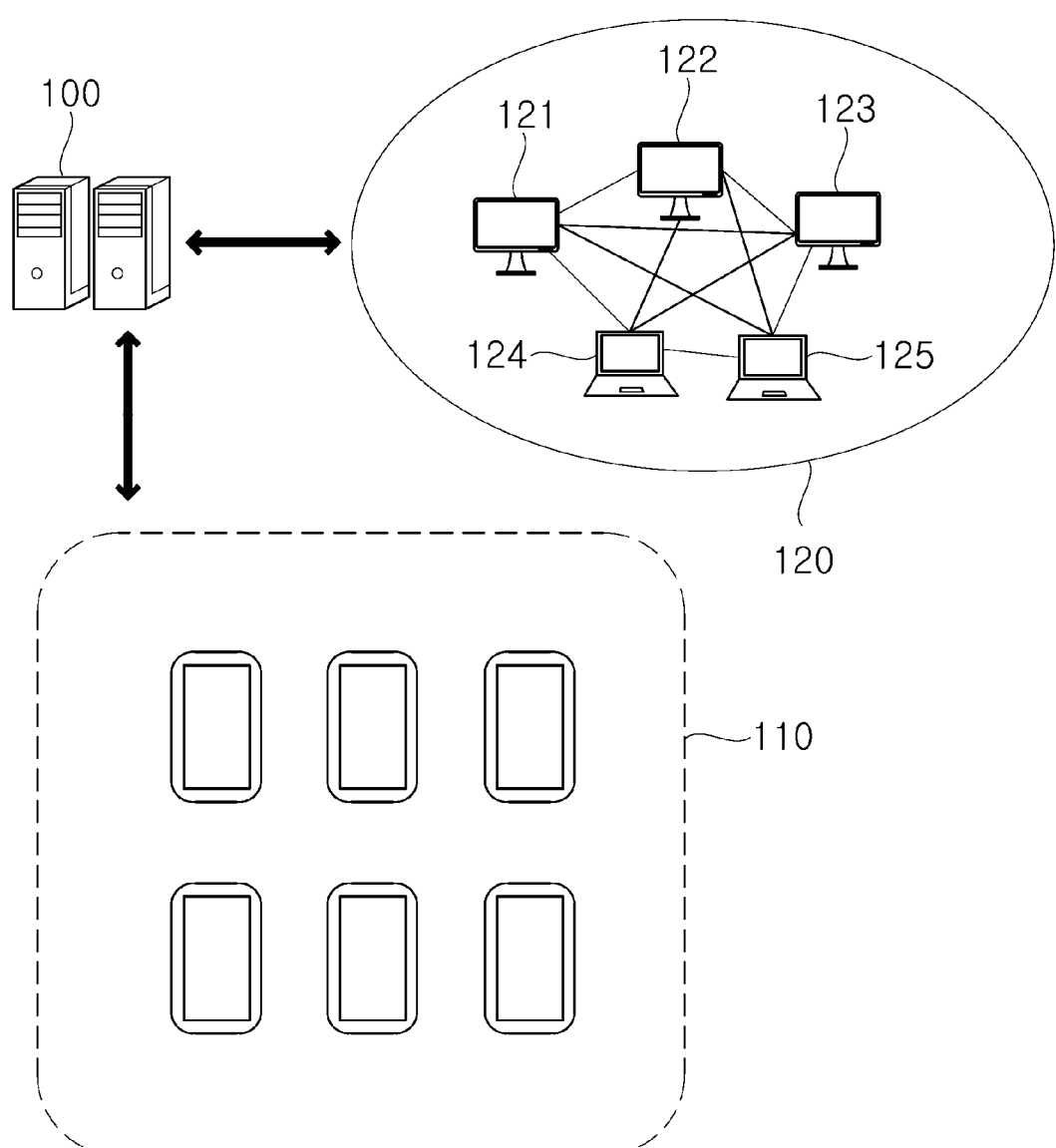
FIG. 3 is a diagram illustrating a control system of a specialist platform according to an embodiment of the present invention.

FIG. 3 is a diagram illustrating a control system of a specialist platform according to an embodiment of the present invention.

Referring to FIG. 3, the system may include a server 100 for performing an operation of a specialist platform, a plurality of specialist groups 110 and a blockchain network 120.

For convenience of description, referring to FIG. 3, the plurality of specialist groups 110 include user terminals of specialists included therein. Further, the definition of the server 100 is as described above, but similarly, for convenience of description, the server 100 corresponds to a computer or a cloud server.

In an embodiment, the server 100 may mean a computer used for performing a work according to one or more services provided in an offline specialist platform, and when the server 100 is an online specialist platform, the server 100 may mean a server that manages the online specialist platform, but is not limited thereto.

In the disclosed embodiment, the server 100 may register a specialist according to a registration request of specialists belonging to a plurality of specialist groups 110 and collect specialist information on the registered specialist. Further, the server 100 may obtain project information in which specialists belonging to the plurality of specialist groups 110 may perform, distribute the project information to specialists belonging to the plurality of specialist groups 110, and perform all administrative and management works for this.

In an embodiment, the server 100 may calculate the specialist's career information from the specialist information, and provide a project appropriate for the specialist based on the calculated career information. Further, the server 100 may collect project data related to a result of a project performed by a specialist and manage the collected project data.

In another embodiment, the server 100 may distribute profits obtained as the project is carried out, but set and pay a commission of the server 100 and then distribute the remaining costs to each specialist, and a method of setting a commission and a method of distributing profits to the specialists are not limited.

Specialists may be freelance specialists, but according to an embodiment, specialists employed by a specific company may also belong to a plurality of specialist groups 110. Similarly, specialists belonging to the plurality of specialist groups 110 may be individuals, but a group (company, etc.) including a plurality of specialists may belong to the plurality of specialist groups 110. In this case, a method of distributing commissions and profits to specialists belonging to a specific group may be applied in the same manner as that in individual specialists, but a different distribution method may be applied by considering the group as one entity. In this case, at least one of a project work and a profit distribution method within the group may be determined by the group itself rather than the server 100.

That is, the plurality of specialist groups 110 may be operated on a member basis, but this may include not only individual members but also group members (e.g., corporate members, etc.), which is not limited.

In an embodiment, specialists belonging to a plurality of specialist groups 110 may be in an employment relation with the server 100 or an operating entity of the server 100, or may be in a contract relation other than an employment relation, which is not limited.

In providing a service for managing specialists, the server 100 may improve the safety and security of information transactions for specialists based on a blockchain. The blockchain is data distribution processing technology, and refers to technology that distributes and stores data such as all transaction details by all users participating in the network. The blockchain may mean a distributed Peer to Peer (P2P) system of a ledger that utilizes software elements configured with algorithms in which blocks connected in sequence so as to ensure and maintain integrity negotiate service usage history information using encryption techniques and security technologies. Here, the distributed P2P system may be a special form of a distributed system. Further, in the P2P system, all nodes of the network may provide resources (processing capability, storage space, data or network bandwidth, etc.) to each other without coordination of a central node. Further, the blockchain may mean distributed ledger technology in which nodes in the network jointly record and manage by distributing a ledger in which usage history information is recorded to a P2P network rather than a central server of a specific institution.

The blockchain network 120 may include nodes 121, 122, 123, 124, and 125. The node may mean a component within the network of the blockchain. Each of the nodes 121, 122, 123, 124, and 125 may be a server device of individuals who subscribe to and participate in the system or the server 100. For example, each of the nodes 121, 122, 123, 124, and 125 may be a special-purpose computer, a general-purpose computer, a supercomputer, a mainframe computer, a personal computer, a smartphone, a tablet PC, etc., but is not limited thereto.

Accordingly, in providing a service for managing specialists, the server 100 may improve the safety and security of information transactions for specialists based on a blockchain.

Hereinafter, according to the disclosed embodiment, a method in which the server 100 manages a plurality of specialist groups 110, obtains project information, distributes the obtained project information to specialists, manages the specialist to perform a project, manages project data, which is the result of the executed project, and manages the resulting profit will be described in detail.

Figure 4:
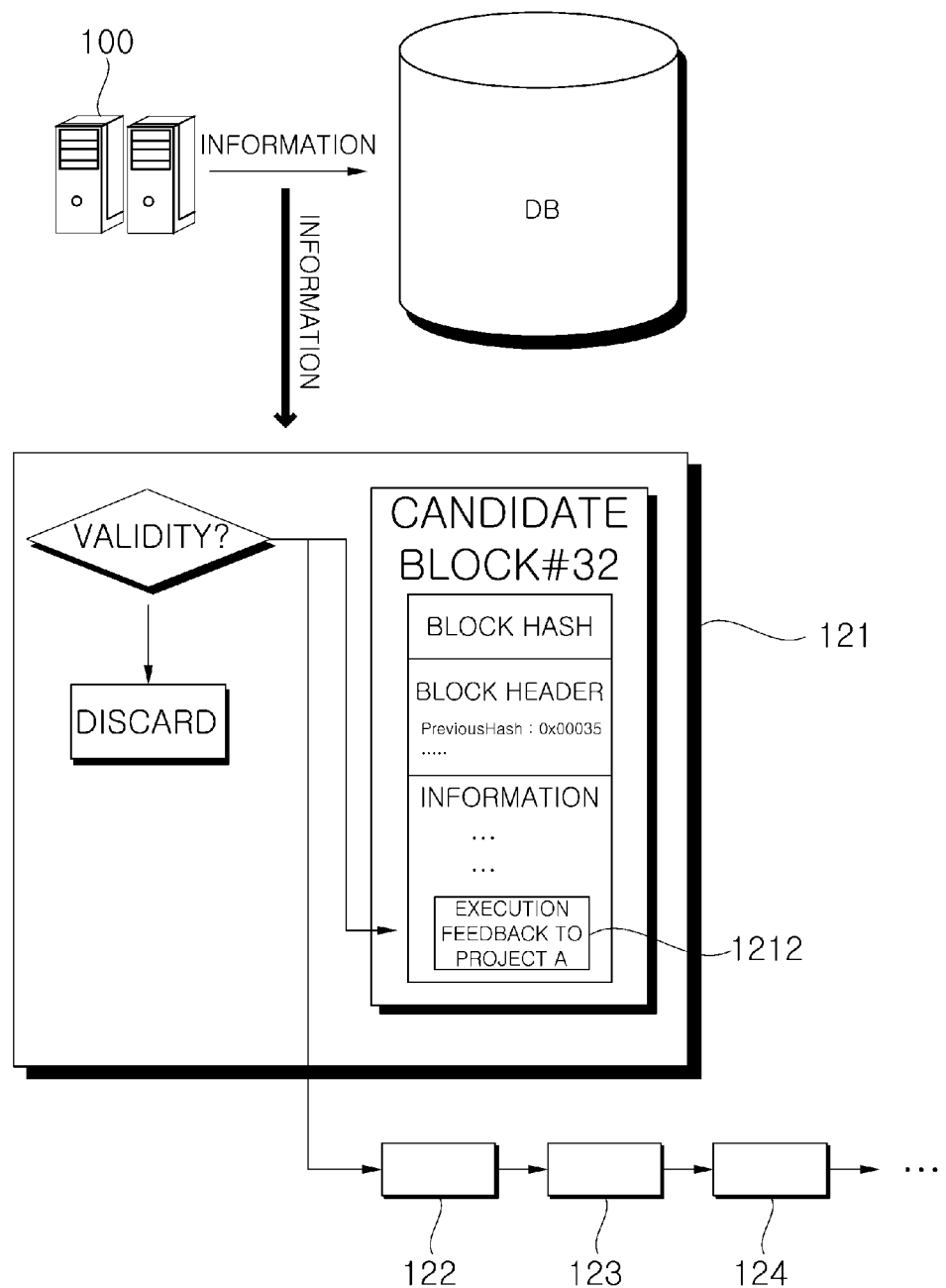
FIG. 4 is a diagram for explaining a process of propagating valid information to nodes on a network of a blockchain and recording the information on the blockchain according to an embodiment of the present invention.

FIG. 4 is a diagram for explaining a process of propagating valid information on a network of a blockchain to nodes on the network of the blockchain and recording the information on the blockchain according to an embodiment.

The server 100 may distribute and store information necessary for specialist management in the blockchain network 120. For example, specialist management information may include specialist background information, specialist status information, specialist career and history information, specialist qualification information, specialist specialty field information, specialist award information, specialist achievement information, specialist performance information, specialist activity (advisory, screening, lecture, presentation, award, SNS activity, reputation, etc.) information, project information in which specialists may perform, specialist subscription information, specialist contract information, specialist orders, participation and execution result information, information on (project) data related to the project execution result of specialists, creative works, works, and copyrights calculated from project data of specialists, profit and payment information of specialists, commission information of specialists, evaluation and reputation information of specialists, information use information of specialists, etc.

According to an embodiment, the background information of the specialist may include information necessary for determining the specialist's specialty field and specialty.

According to an embodiment, background information of the specialist may be divided into structured information and unstructured information. The structured information may mean information (or information that can be quantified) that an association to the specialty of a specific specialty field has already been quantitatively proved. For example, as described above, objective data that can prove a specialist may correspond to structured information. For example, the structured information may include a history of having worked in a company or department in a specific field, a history of having participated in a project or a task in a specific specialty field, academic background or thesis presentation information in a specific field, etc, but is not limited thereto.

Further, the unstructured information does not belong to the structured information, but may mean all types of history information having an association with a specific specialty field. For example, as described above, history information according to individual efforts may belong to unstructured information. For example, the unstructured information may include records of activities in online communities or clubs, materials created for personal projects or hobbies, and information on taking online educational contents, but is not limited thereto.

In an embodiment, background information of a specialist on a new specialty field in which the structured information has not been previously stored may be obtained. In this case, because no structured information, which is a criterion for evaluating the corresponding specialty field, is not stored at all, background information of all specialists may be evaluated as unstructured information.

For example, even if it is information that has worked in a job or department in a specific specialty field, or information that has performed a project or a task, when there is no pre-evaluated or stored information for the specific field, it is evaluated as unstructured information to be used for evaluating the specialty of each specialist for the corresponding special field.

In addition, advisory (committee) activities, screening and evaluator activities, classes and lectures, mentoring activity history, and outside history may be included in the background information of specialists, which may belong to structured information or unstructured information. For example, a classification criterion may be whether an association with the specialty of a specific specialty field has been formed in a database by previously quantitatively verifying, but is not limited thereto.

Further, data that can verify the morality of specialists may also be included in the background information of specialists, and for example, various information such as the corresponding industry or a type of the industry, awareness and reputation of activities in SNS, whether or not rebates, criminal records, and fraud records may be used, and even if all information is not practically available, information that can be collected by being disclosed to the outside may be used as background information of specialists classified into structured information or unstructured information.

Some of the above-described structured information and unstructured information may be difficult to quantify as data. A case in which it is difficult to quantify data may mean a case where data quantification is impossible because the standard is not established. In this case, data that are difficult to quantify may be directly input based on peripheral evaluation and be quantified through various types of algorithms.

According to an embodiment, status information of specialists may include information necessary for evaluating an amount of projects in which each specialist may currently perform or the number of projects in which each specialist may participate, such as an affiliation of each specialist, the presence or absence of affiliation, a current project, and other personal circumstances.

According to an embodiment, project data related to a project execution result may mean all data obtained during a project process, and does not mean only meaningful results for a project. For example, a plurality of proposals calculated from a Request For Proposal (RFP) presented in a project bidding process may be project data according to the present invention. Thus, not only an adopted proposal, but also a non-adopted proposal may be project data according to the present invention.

According to an embodiment, a creative work means data on a work obtained from project data. In this case, the creative work may mean data newly created from a project execution subject among project data. However, the creative work is not limited thereto, and the creative work may mean data having creativity among newly generated data from the project execution subject. The creative work has a different concept from that of a copyrighted work, and the creative work may be a copyrighted work only if it is determined that it does not infringe the copyright of others.

However, specialist management information that can be stored on the blockchain is not limited thereto, and may include the above-described information and any other types of information necessary for specialist management.

According to an embodiment, the server 100 may transmit information to the node 121 of the blockchain network 120.

The server 100 may encrypt information and transmit the encrypted information to the node 121 on the blockchain network 120. The node 121 may decrypt the encrypted information and verify whether the information is valid based on the decrypted result. As a result of verifying the validity of the information, when the information is not valid, the node 121 may discard the information. According to an embodiment, the validation verification of the information may be performed by comparing a first hash value obtained by applying a hash function to the received information and a second hash value obtained by decrypting a received cipher text using a public key of an operator of the server 100, but is not limited thereto.

As a result of verifying the validity of information, when the information is valid, the node 121 may transmit the information to the node 122 on the blockchain network 120. Further, the node 121 may record 1212 information at the candidate block. When predetermined transaction information is recorded in the candidate block, by performing proof of a work on the candidate block, the node 121 may generate a valid block. Further, when the validity of the information is verified in the node 122, by adding the information to the candidate block and performing proof of work on the candidate block, the node 122 may generate a valid block.

The same operation as that in the node 122 may be performed at the node 123 and the node 124.

When describing a process of generating a valid block in the node 121 and adding the valid block to the blockchain, the node 121 may calculate a root of a Merkle tree for predetermined information. The node 121 may generate a hash reference pointing a previous block header from the standpoint of the block to be added to the blockchain. The node 121 may obtain a required difficulty level in the proof of work or constraint condition of the block to be added to the blockchain. The node 121 may determine whether a value of a block hash generated by applying a hash function to a root of the Merkle tree, a hash reference indicating a previous block header, a difficulty level, and timestamp data and nonce satisfies the constraint condition. By obtaining a value of a nonce that satisfies the constraint condition while increasing the nonce by 1 from 0, the node 121 may perform a proof of work on the candidate block. The node 121 may add a candidate block as a valid block to the blockchain. Further, the node 121 may transmit a valid block to other nodes 122, 123, 124, etc. on the network of the blockchain.

Each of the nodes 122, 123, and 124 on the network of the blockchain performs verification on a valid block received in the node 121, and thus valid blocks may be added to the blockchain held by each of the nodes 122, 123, and 124.

Accordingly, by safely protecting the information based on blockchain technology, the server 100 may secure the security and reliability of the specialist platform.

Further, various embodiments may be provided based on a blockchain.

In the disclosed embodiment, information on the specialist, information on a project performed by the specialist, and information on the result may all be stored in the blockchain.

For example, in step of providing the above-described project information to specialists included in a specialist pool, the server 100 may perform step of providing first project information to a first specialist.

Further, the server 100 may perform step of storing the first project information in the first blockchain, but storing the first project information to match to the information on the first specialist.

Further, the server 100 may perform step of storing information on the first specialist in a second blockchain, but storing the information on the first specialist to match to the first project information.

Further, in step of storing the above-described first project information in the first blockchain, the server 100 may perform step of storing, in the first blockchain, information obtained by hashing a node on the second blockchain in which the first project information is stored.

Further, in step of storing the above-described information on the first specialist in the second blockchain, the server 100 may perform step of storing, in the second blockchain, information obtained by hashing a node on the first blockchain in which information on the first specialist is stored.

Thereby, the first blockchain and the second blockchain are linked to each other, and although they are different blockchains, they may operate like blockchains that are connected to each other through one or more points of contact and verify each other's information. Thereby, the two blockchains may verify each other, and even if a problem occurs in one of the two blockchains, the other blockchain is not affected and thus a means that may back up and doubly verify information may be provided.

In an embodiment, the server 100 may receive a verification request for the first project information.

In this case, the server 100 verifies the first project information based on the blockchain, but may doubly verify the information by using two related blockchains.

Further, the server 100 may verify the first project information based on the first project information stored in the second blockchain.

Further, the server 100 may obtain a first hash value obtained by hashing the node in which the first project information is stored.

Further, the server 100 may obtain information on the first specialist who has performed the first project information.

Further, the server 100 may verify the first hash value based on a node on the first blockchain in which information on the first specialist is stored.

Further, the server 100 may receive a verification request for the first specialist.

Further, the server 100 may verify the first specialist based on information on the first specialist stored in the first blockchain.

Further, the server 100 may obtain a second hash value obtained by hashing a node in which information on the first specialist is stored.

Further, the server 100 may obtain the first project information performed by the first specialist.

Further, the server 100 may verify the second hash value based on the node on the second blockchain in which the first project information is stored.

The server 100 may return whether the verification was successful, and perform a process of evaluating the first project information and the specialty of the first specialist or obtaining career information according to whether the verification was successful, and use the process for matching between the specialist and the project information.

Figure 5:
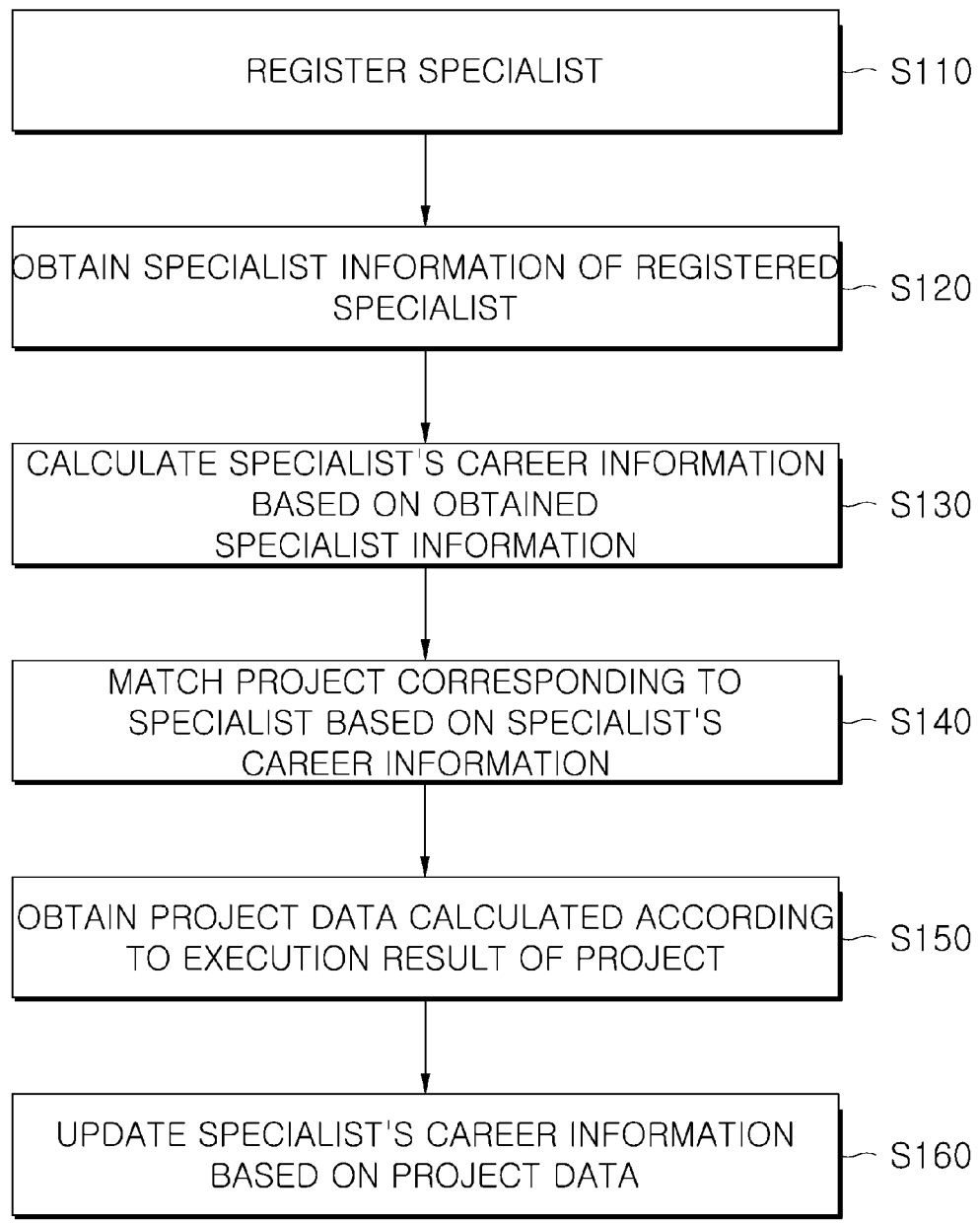
FIG. 5 is a flowchart illustrating a method of controlling a specialist platform according to an embodiment of the present invention.

FIG. 5 is a flowchart illustrating a method of controlling a specialist platform according to an embodiment of the present invention.

In step S110, the server 100 may register the specialist.

In step S120, the server 100 may obtain specialist information of the registered specialist.

In the present specification, when a specific person produces a specific result in a certain field of work, the specialist information may mean information related to the produced result.

Therefore, specialist information may include all kinds of information for evaluating the specialty of each specialist or obtaining specialist career information, and information capable of evaluating the specialist's specialty may mean information having a correlation of a predetermined reference value or more with the specialist's specialty in a specific specialty field, and the career information of a specialist may mean a degree of specialty obtained based on specialist information about the specialist, but is not limited thereto.

Further, the specialist information may mean information on a history of the corresponding specialist, and according to embodiments, the history may include various information. For example, the history may include information such as a workplace where each specialist has worked, an academic background of each specialist, thesis published by each specialist, projects in which each specialist has participated, and awards and holding certificates, and the history may be understood as a meaning encompassing all of various structured information and unstructured information such as records of each specialist's activities in online communities or clubs, personally performed projects or materials prepared as hobbies, SNS activities and reputation.

In an embodiment, the server 100 may obtain information input by the specialist, and also collect crawled information about the specialist to collect specialist information.

For example, the server 100 may obtain a resume or a reference of a specialist or information input or freely prepared by a specialist based on a preset format. The information input by the specialist may include information on the specialist's past project performance and various information in which the specialist wants to present in the special field.

In an embodiment, the server 100 may collect information related to the corresponding specialist through web crawling. For example, the server 100 may collect information on the specialist based on personal information of the specialist.

The server 100 may obtain information that is not input by the corresponding specialist through crawling, but is not limited thereto, and for example, the server 100 may verify information input by the corresponding specialist or may crawl in order to collect more information based on the information input by the corresponding specialist.

For example, when the corresponding specialist inputs information on activity on a specific community site, the server 100 may crawl information about the corresponding specialist on the corresponding community site, and in this case, according to an embodiment, the server 100 may also crawl using basic information including an ID or a nickname input by the corresponding specialist. This may be used for supplementing a part that cannot be submitted by collecting all data directly by the specialist or may be used for verifying the information input by the specialist.

In step S130, the server 100 may calculate career information of the specialist based on the obtained specialist information.

In an embodiment, the server 100 may verify the obtained specialist information and calculate the specialist's career information based on the verified specialist information. In this case, the verification of specialist information may mean a work of verifying the authenticity of information directly input by the specialist and information obtained through web crawling.

In an embodiment, when specialist information to be verified is information on past project execution input by the specialist, the server 100 may obtain a source of the project and request specialist information from the obtained project source to determine whether the specialist information input by the specialist and the specialist information received from the project source are the same, thereby verifying the specialist information.

In another embodiment, when the specialist information to be verified is information obtained by crawling, the server 100 may obtain category information from the information obtained by crawling and compare the category information with specialist information corresponding to the obtained category among the previously verified specialist information to verify the specialist information. For example, when the category information is education category information, by comparing information (e.g., graduation from University A) on the education category included in the information obtained by crawling and information (e.g., graduation from University B) corresponding to the education category among previously verified specialist information, the server 100 may verify specialist information. When University A and University B are different universities, the information obtained by crawling may be excluded from specialist information.

As another example, when the category information is executed project category information, the server 100 may compare information (e.g., project A) on an executed project category included in the information obtained by crawling and information (e.g., project B) corresponding to the executed project category among previously verified specialist information to verify specialist information. When the project A and the project B are the same project, the server 100 may obtain information obtained by crawling as verified specialist information. The server 100 may further determine whether the detailed project execution details are the same. When the project A and the project B are different projects and both projects cannot be simultaneously executed, the server 100 may exclude information obtained by crawling from the specialist information. When the project A and the project B are different projects and both projects may be executed at the same time, the server 100 may request proof data on whether the information obtained by crawling is authentic to the specialist to verify the specialist information.

In addition to the above-described embodiments, the server 100 may extract various category information from specialist information and verify specialist information corresponding to the extracted category information.

Hereinafter, unless otherwise noted, the specialist information utilized or described in the specialist platform is verified specialist information, and various embodiments will be described.

In step S140, the server 100 may match a project corresponding to the specialist based on the specialist's career information.

In step S150, the server 100 may obtain project data calculated according to a result of performing the project.

In step S160, the server 100 may update career information of the specialist based on the project data.

Figure 6:
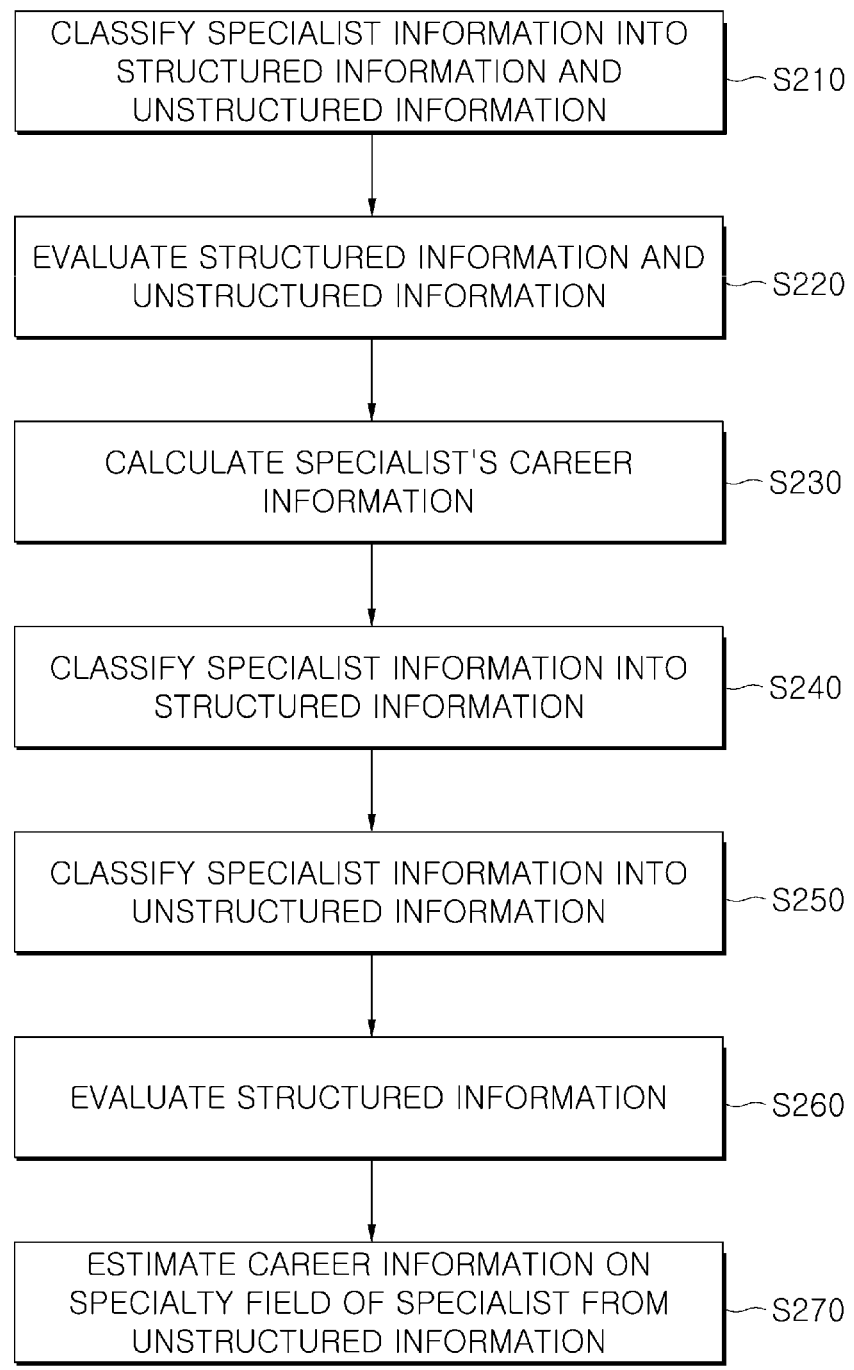
FIG. 6 is a flowchart illustrating a method of calculating career information of a specialist according to an embodiment of the present invention.

FIG. 6 is a flowchart illustrating a method of calculating career information of a specialist according to an embodiment of the present invention.

In step S210, the server 100 may classify the specialist information into structured information and unstructured information.

As described above, in the present specification, specialist information may be divided into structured information and unstructured information.

In an embodiment, the structured information may mean information (or information that can be quantified) in which an association with the specialty of a specific specialty field has already been quantitatively proven. For example, as described above, objective data that can prove a specialist may correspond to structured information.

For example, the structured information may include information on a history of having worked in a company or department in a specific field, a history of having participated in a project or a task in a specific specialty field, academic background or thesis presentation information in a specific field, participating projects, awards, and holding certificates, but is not limited thereto.

In an embodiment, the unstructured information may mean all types of information having an association with a specific specialty field instead of belonging to the structured information. For example, as described above, information according to individual efforts may belong to unstructured information.

For example, the unstructured information may include records of activities in online communities or clubs, personally executed projects or materials created for hobbies, information on taking online education content, information on SNS activities and reputation information, etc., but it is not limited thereto.

In an embodiment, specialist information on a new specialty field in which the structured information has been not previously stored may be obtained. In this case, because no structured information, which is a criterion for calculating career information or evaluating specialty, has been stored in the corresponding specialty field, all specialist information may be evaluated as unstructured information.

For example, even in information about a job or a department worked in a specific specialty field or information in which a project or a task has performed, when there is no pre-evaluated or stored information for the specialty field, the information may be used for evaluating as unstructured information to evaluate the specialty of each specialist in the specialty field or to obtain career information of each specialist in the specialty field.

In addition, advisory (committee) activities, screening and evaluator activities, classes and lectures, mentoring activity career, and outside experience may be included in the specialist information, which may belong to structured information or unstructured information. For example, the classification criterion may be whether an association with the specialty of a specific specialty field has been formed in a database by previously quantitatively verifying, but is not limited thereto.

Further, data that can verify the morality of specialists may also belong to specialist information, and for example, various information such as awareness and reputation of activities in the corresponding industry or a type of the industry, SNS, etc., whether or not rebates, criminal records, and fraud records may be used, and even if all information is not available in reality, any information that can be collected by being disclosed to the outside may be used as specialist information classified as structured information or unstructured information.

Some of the above-described structured information and unstructured information may be difficult to quantify as data. A case in which it is difficult to quantify data may mean a case where data quantification is impossible because the criterion is not established. In this case, data that are difficult to quantify may be directly input based on peripheral evaluation and be quantified through various types of algorithms.

For example, specialists and each specialist information according to the disclosed embodiments may be set in various ways, and may include, for example, specialists that everyone knows, specialists proved by objective data, specialists who have acquired specialty equivalent to or higher than those of specialists as non-professionals who have individually tried to become specialists, specialists who have been proved by objective data to a certain level, or specialists who have increased their specialty by adding individual efforts.

Therefore, in order to calculate career information of such various specialists, it is necessary to classify specialist information according to a property thereof. Hereinafter, an embodiment in which the information is classified into structured information and unstructured information and of calculating career information of the specialist accordingly will be described in detail.

In an embodiment, the structured information may mean information in which an association with the specialty of a specific specialty field has already been quantitatively proven. For example, as described above, objective data that can prove the specialist's career information may correspond to the structured information.

For example, the structured information may include a history of been worked in a company or department in a specific field, a history of having participated in a project or a task in a specific specialty field, academic background or thesis presentation information in a specific field, etc., but is not limited thereto.

Further, advisory (committee) activities, screening and evaluator activities, classes and lectures, mentoring activity history, and outside history may be included in the specialist information, which may belong to either structured information or unstructured information. For example, the classification criterion may be whether an association with the specialty of a specific specialty field has been previously quantitatively proven and has been formed in a database, but is not limited thereto.

Further, data that can verify the morality of specialists may also belong to specialist information, and for example, various information such as awareness and reputation of activities in the corresponding industry or a type of the industry, SNS, etc., whether or not rebates, criminal records, and fraud records may be used, and even if all the information is not available in reality, any information that may be collected by being disclosed to the outside may be used for calculating the specialist's career as well.

In an embodiment, the unstructured information does not belong to the structured information, but may mean all types of information having an association with a specific specialty field. For example, as described above, information according to individual efforts may belong to unstructured information.

For example, the unstructured information may include records of activities in online communities or clubs, personally performed projects or materials created for hobbies, and information on taking online educational content, but is not limited thereto.

In an embodiment, specialist information on a new specialty field in which the structured information has been not previously stored may be obtained. In this case, because no structured information, which is a criterion for calculating career information on the corresponding specialty field or evaluating specialty, has been stored, all specialist information may be evaluated as unstructured information.

For example, even in information that has worked in a workplace or department in a specific specialty field or information that has performed a project or a task, when there is no information that has been previously evaluated or stored for the corresponding specialty filed, the information may be evaluated as unstructured information and be used for evaluating the specialty of each specialist in the specialty field.

In step S220, the server 100 may evaluate the structured information and the unstructured information.

In an embodiment, the server 100 may individually evaluate each structured information, or may comprehensively evaluate a plurality of structured information, and a method thereof is not limited.

In an embodiment, the server 100 may individually evaluate each unstructured information, or may comprehensively evaluate a plurality of unstructured information, and a method thereof is not limited.

In step S230, the server 100 may calculate career information of the specialist based on the evaluation result.

In an embodiment, the server 100 may obtain career information of the specialist based on the evaluation result of the structured information and the unstructured information. However, the present invention is not limited thereto, and the server 100 may obtain specialty evaluation information based on specialist information including structured information and unstructured information, and obtain specialist's career information from the obtained specialty evaluation information.

In an embodiment, the server 100 may individually evaluate specialist information including each of the structured information and the unstructured information, evaluate the specialist's career information or specialty in a manner of summing the individually evaluated results, comprehensively evaluate a plurality of specialist information, group some specialist information to evaluate the specialty of each group, and evaluate specialists' career information or specialty in a manner of summing the results of the overall specialty evaluation, and a method thereof is not limited.

In step S240, the server 100 may classify specialist information corresponding to the history information stored in the database as structured information.

In an embodiment, information on each specialty field and history information corresponding to each specialty field may be stored in advance in the database.

The server 100 may determine information already stored in the database as structured information using the database. In an embodiment, the server 100 may perform a process of matching information stored in the corresponding database to specialist information. For example, because specialist information input or crawled by a specialist may not be accurately matched to the information previously stored in the database, by matching similar information with each other, the server 100 may perform a process of determining whether the information is structured information. For example, the server 100 may determine that information showing a matching rate of a predetermined reference value or more with information stored in the database is structured information.

In an embodiment, by displaying database information matched in an input step by the specialist and enabling the specialist to directly match the corresponding database information, the server 100 may filter the structured information in the input step.

In step S250, the server 100 may classify information on specialty fields not stored in the database and specialist information corresponding to history information not stored in the database as unstructured information.

In an embodiment, the server 100 may classify specialist information, except for the structured information classified based on the database as unstructured information.

In an embodiment, a plurality of databases may be hierarchically configured. For example, information on each specialty field and history information corresponding to each specialty field may be stored in a first database, and specialist information corresponding to the information stored in the first database may be classified as structured information.

Further, information on each specialty field and history information corresponding to each specialty field may be stored in a second database, but specialist information corresponding to the information stored in the database may be classified as unstructured information, and similarly, information that is not stored in both the first database and the second database may be classified as unstructured information.

Further, according to an embodiment, specialist information corresponding to information stored in the second database is classified as unstructured information, but information stored in the second database may be used for evaluation of the corresponding unstructured information.

That is, the information stored in the second database may correspond to an intermediate step between the unstructured information and the structured information, but the information stored in the second database may not be evaluated as structured information. However, this is only an embodiment, and a configuration of the database and a method of using the database are not limited.

In step S260, the server 100 may evaluate the structured information based on the evaluation information stored in the database.

For example, evaluation information on specialist information corresponding to each structured information may already be stored in the database, and the server 100 may quantitatively calculate a score corresponding to each structured information based on the information stored in the database.

For example, in the database, information on how specific history information is related to a specific specialty field and how long careers may be recognized based on a period of the history information and a role played by the specialist in the history information may be stored in advance.

The information stored in advance may be input by a specialist in the corresponding field or may be determined based on information calculated based on previously collected big data. For example, when there are a lot of reference data for the corresponding field, the server 100 may build big data using the reference data, determine a correlation between each field and history information using learning methods such as machine learning, and obtain information that can quantitatively evaluate specialty according to detailed information of each history information.

Such information may be stored in advance in a database to be used for evaluating specialist information classified as structured information.

In step S270, the server 100 may estimate career information on a specialty field of the specialist from the unstructured information using a model learned to derive an association between the history information and the specialty of each specialty field.

The learned model may be a model learned to derive an association between specific history information and specialty in each specialty field, and to estimate the specialty of a corresponding specialist from unstructured information.

In an embodiment, when new unstructured information is obtained for a specific specialty field previously stored in the database, the learned model may estimate an association between the unstructured information and the specialty field.

Further, the learned model may estimate a correlation between a new specialty field that is not stored in the database and new unstructured information on the specialty field.

In an embodiment, the learned model may be learned based on information stored in the database. The server 100 may generate various learning data based on the information stored in the database, and for example, in order to estimate an association between a specific specialty field previously stored in the database and new unstructured information, the server 100 may generate learning data including history information in which an association with the specialty field previously stored in the database is labeled in advance, and train the model based on the generated learning data.

As another example, in order to estimate an association between a specific specialty field that has been not previously stored in the database and new unstructured information, the server 100 may generate feature information extracted for a specific specialty field, feature information extracted for specific history information, and learning data in which a correlation between each feature information is previously labeled and train a model based on the generated information and data.

That is, the server 100 may classify structured information and unstructured information of the specialist using the database and the model learned based on the database, and evaluate specialist information on each classified information to estimate career information of the specialist.

Figure 7:
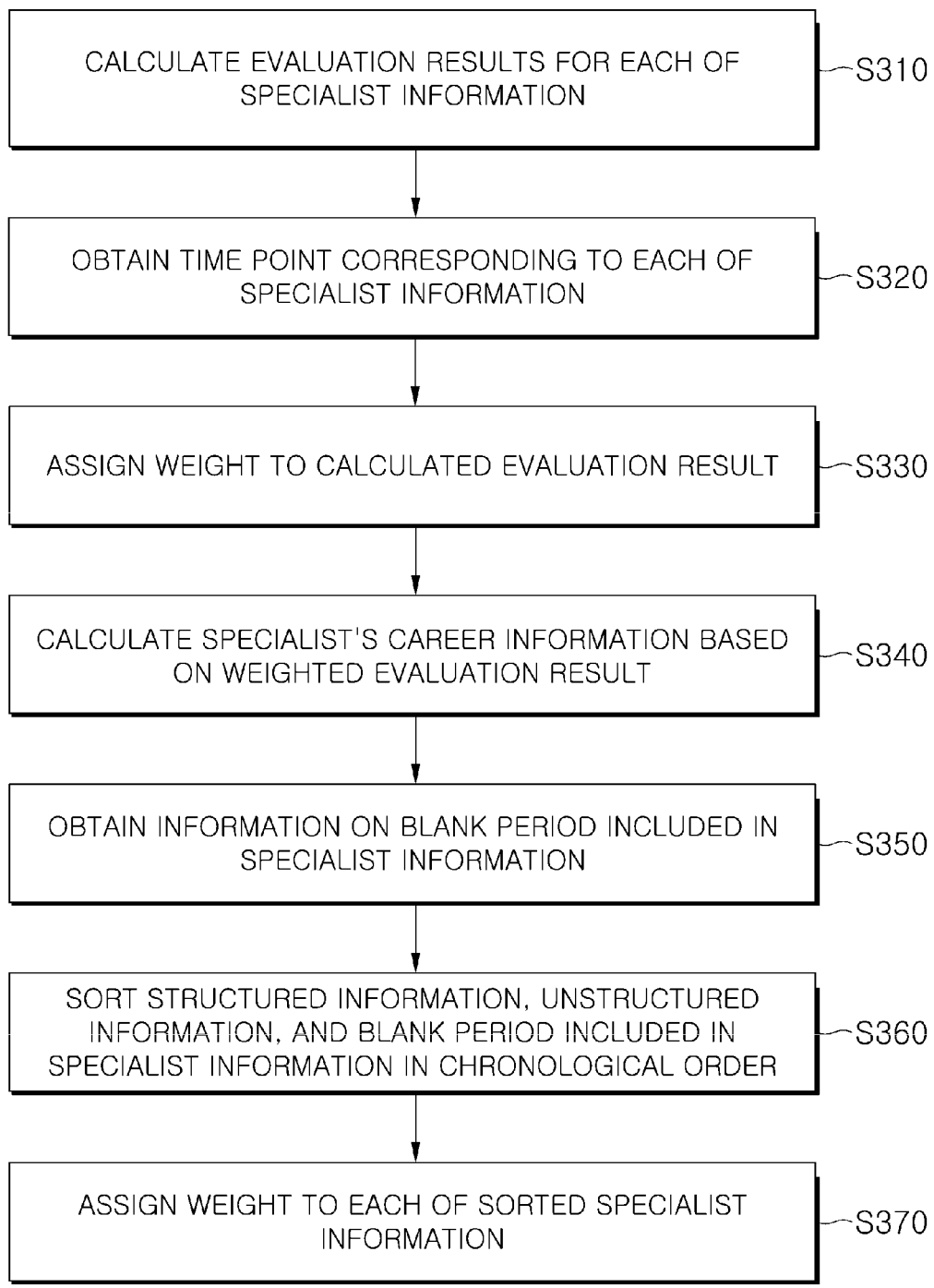
FIG. 7 is a flowchart illustrating another method of calculating career information of a specialist according to an embodiment of the present invention.

FIG. 7 is a flowchart illustrating another method of calculating career information of a specialist according to an embodiment of the present invention.

In step S310, the server 100 may calculate evaluation results of each specialist information.

In step S320, the server 100 may obtain a time point corresponding to each specialist information.

For example, the time point may include information on a working period, a project participation period (including a start time point and an end time point), an online community activity period, a thesis presentation time point, a certification acquisition time point, a project execution time point, etc., but is not limited thereto.

In step S330, the server 100 may give a weight to the evaluation result calculated based on a period from a time point corresponding to each specialist information to the present.

For example, the server 100 may give a weight to reduce the evaluation result for old specialist information. That is, because old specialist information may be forgotten and the specialist's knowledge and sense may become dull over time, the server 100 may give a weight to reduce the evaluation results for the corresponding specialist information over time.

Similarly, the server 100 may give a weight to increase the evaluation result as a period of each career information is longer and give a weight to increase the evaluation result for more recent specialist information.

In step S340, the server 100 may calculate the specialist's career information based on the weighted evaluation result.

In step S350, the server 100 may obtain information on a blank period included in the specialist information.

That is, the specialist information may include not only the structured information and the unstructured information, but also information on the blank period, and one or more structured information and unstructured information may overlap each other.

The blank period may mean a period in which there is no structured information and a period in which both structured information and unstructured information are absent. Further, the unit of the blank period may be divided into various units such as several hours for small time and day, week, month, and year for long time.

In step S360, the server 100 may sort the structured information, the unstructured information, and the blank period included in the specialist information in chronological order.

In step S370, the server 100 may give a weight to each of the sorted specialist information.

For example, when there is blank information following specific specialist information, the weight will be adjusted so that the evaluation result of the specialist information decreases during the blank period. However, even in information that has passed for a long time, if careers in the same special range are continuously registered thereafter, the weight may be set so that the evaluation result does not decrease or increases according to the embodiment.

Further, unstructured information may be disposed during the blank period of the structured information, and in this case, the unstructured information corresponding to the specialist information obtained during the blank period of the structured information may be evaluated, and when the evaluation result is a preset reference value or more, the corresponding position may be evaluated as continuous career information instead of being considered as a blank area.

In an embodiment, a blank area less than a preset period may be ignored.

Because specialist information that can prove specialty in a specific field may be recognized for a higher value as it lasts longer, the weight may also be adjusted to be appropriate. As the evaluation result of each specialist information is higher, the weight of the previous specialist information may also be adjusted in a direction of highly recognizing the specialty, but it is not limited thereto.

Figure 8:
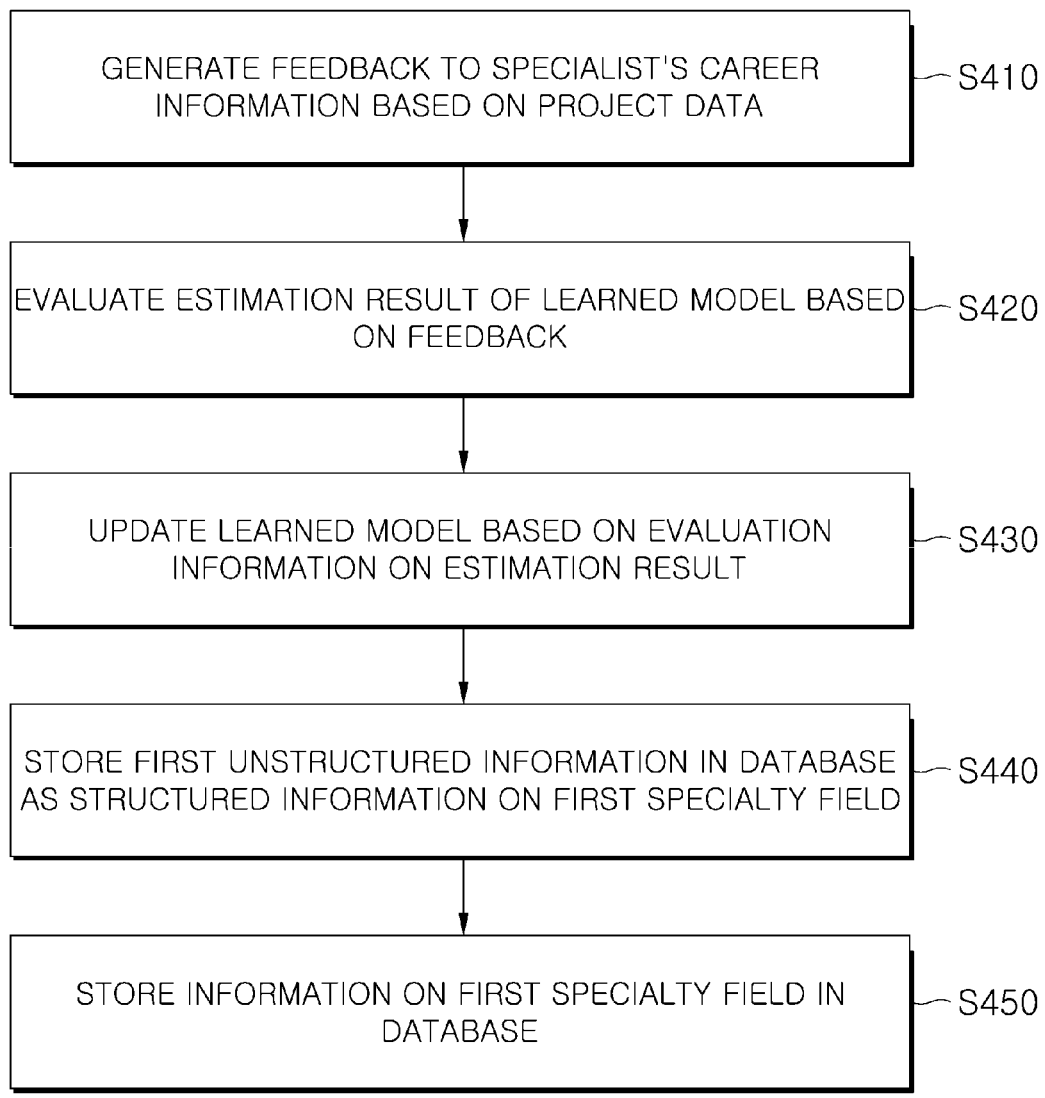
FIG. 8 is a flowchart illustrating a method of updating career information of a specialist according to an embodiment of the present invention.

FIG. 8 is a flowchart illustrating a method of updating career information of a specialist according to an embodiment of the present invention.

In step S410, the server 100 may generate feedback on career information of the specialist based on project data.

The type of feedback is not limited, but information about a difference between career information estimated for a corresponding specialist and career information obtained based on a result of work processing may be included in the feedback.

Further, the server 100 may perform step of updating the specialty of the specialist based on the feedback.

That is, the server 100 may maintain, increase, or decrease the specialist's career information based on the feedback.

Further, when a change occurs in career information of the specialist, the server 100 may utilize career information of the specialist or may provide a means for providing career information of the specialist.

For example, types of tasks and projects assigned to the corresponding specialists or the types of works in charge of the tasks and projects may be changed according to the specialist's career information, and educational information to increase the specialty of the corresponding specialists may be provided.

Further, when the specialty estimation results based on the unstructured information and the actual estimated career information are different, the server 100 may update the model based on this.

In step S420, the server 100 may evaluate the estimation result of the learned model based on the feedback.

For example, the specialist's specialty may be estimated from unstructured information by using the model learned as described above, and this may be evaluated based on the specialist's actual work execution result.

In step S430, the server 100 may update the learned model based on the evaluation information on the estimation result.

By using the unstructured information of the corresponding specialist and information including the actual work execution result as new learning data or by performing learning by adding the information to the existing learning data, the server 100 may update the learned model.

Likewise, the server 100 may update the model learned through reinforcement learning based on the estimation result and feedback therefor.

In step S440, when an association between first unstructured information and a first specialty field exceeds a preset reference value, the server 100 may store the first unstructured information in the database as structured information on the first specialty field.

In step S450, when information on the first specialty field is not stored in the database, the server 100 may store information on the first specialty field in the database.

That is, even in the case of unstructured information, when references related to the unstructured information are sufficiently accumulated and thus when it may be determined that an association with a specific specialty field is a preset reference value or more, by adding the unstructured information and information on the corresponding specialty field to the database, the server 100 may register the unstructured information as structured information.

For example, a specific online community activity may be initially treated as unstructured information, but when the specialty of specialists actively working in the corresponding online community is proven, activity information in the corresponding online community may be registered as structured information.

Further, even in the case of a specialty field that has been not previously stored in the database, when an association of a predetermined reference value or more with one or more unstructured information is secured, information on the corresponding specialty field and the corresponding unstructured information may be registered in the database as structured information.

Figure 9:
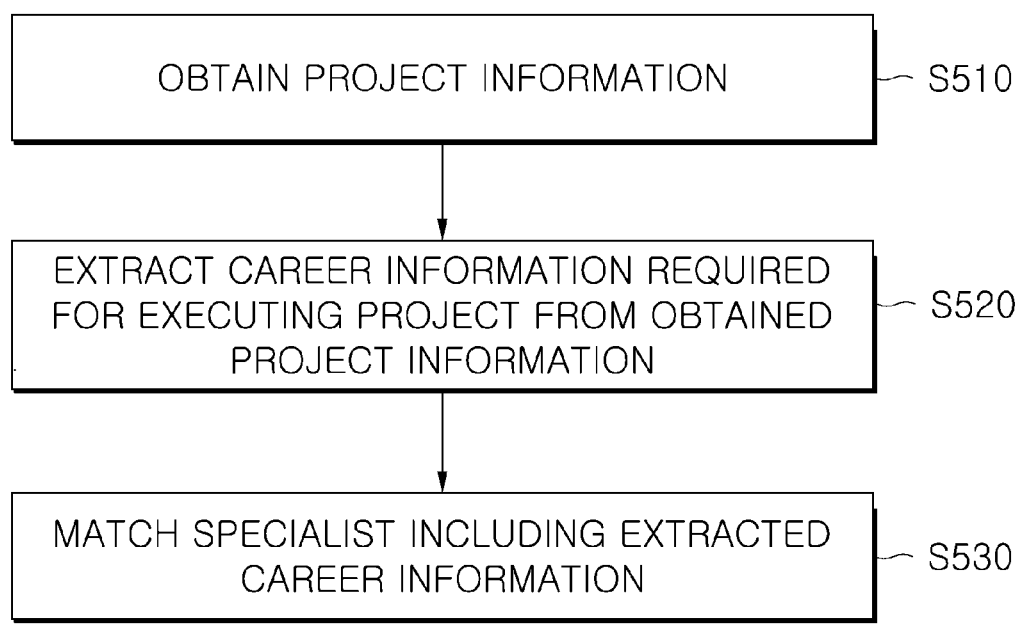
FIG. 9 is a flowchart illustrating a method of providing a project to a specialist according to an embodiment of the present invention.

FIG. 9 is a flowchart illustrating a method of providing a project to a specialist according to an embodiment of the present invention.

In step S510, the server 100 may obtain project information.

In this case, the project information may be information on various configurations included in the project. In an embodiment, the project information may mean data on a registration subject of the project, information on a category of the project, a request for proposal (RFP) of the project and details of a task, information on a start time point or a completion time point of the project, information on an execution subject of the project, information on an execution work of the project, information on the outcome of the project, etc.

In step S520, the server 100 may extract career information required for executing the project from the obtained project information.

In an embodiment, the server 100 may extract information on a specialty field from information on a project category, a request for proposal (RFP) of a project, and details of a task among project information, and extract career information required for executing the project from information on an execution work of the project.

In step S530, the server 100 may match a specialist including the extracted career information.

In an embodiment, when the career information required for executing the project is career information that requires a position of a project manager (PM) to perform the preset number of times or more, the server 100 may match a specialist with career information that has performed the PM the preset number of times or more to the project. Alternatively, when the career information required for executing the project is career information that requires the project manager (PM) for a project of a size that satisfies a preset condition to perform the preset number of times or more, the server 100 may match a specialist with career information that have performed the PM for a project of a size that satisfies the preset conditions by a preset number of times or more to the project. In this case, the size of the project may vary as in a size according to a range of a budget, a size according to a range of a task, a size according to a range (number) of specialists to be invested, and a size according to a regional range.

According to various embodiments of the present disclosure, the server 100 may match a project and a specialist based on various information as well as career information. For example, the server 100 may match a project with a specialist capable of performing a work during the period based on a project execution period or may match a specialist capable of performing the corresponding work with the project based on a work level of the project. Alternatively, when there are two or more specialists required for a project, the server 100 may first match a main specialist appropriate for the project, and then match a sub-specialist who can exhibit the best synergy with the main specialist to the project. According to various embodiments, the main specialist and the sub-specialist may be specialists belonging to the same specialist pool. Alternatively, the sub-specialist may be determined as a specialist who can cover all career information, except for career information corresponding to career information of the main specialist among career information extracted from the project information. However, the present invention is not limited thereto, and the server 100 may match a project with a specialist based on various information, as needed.

Figure 10:
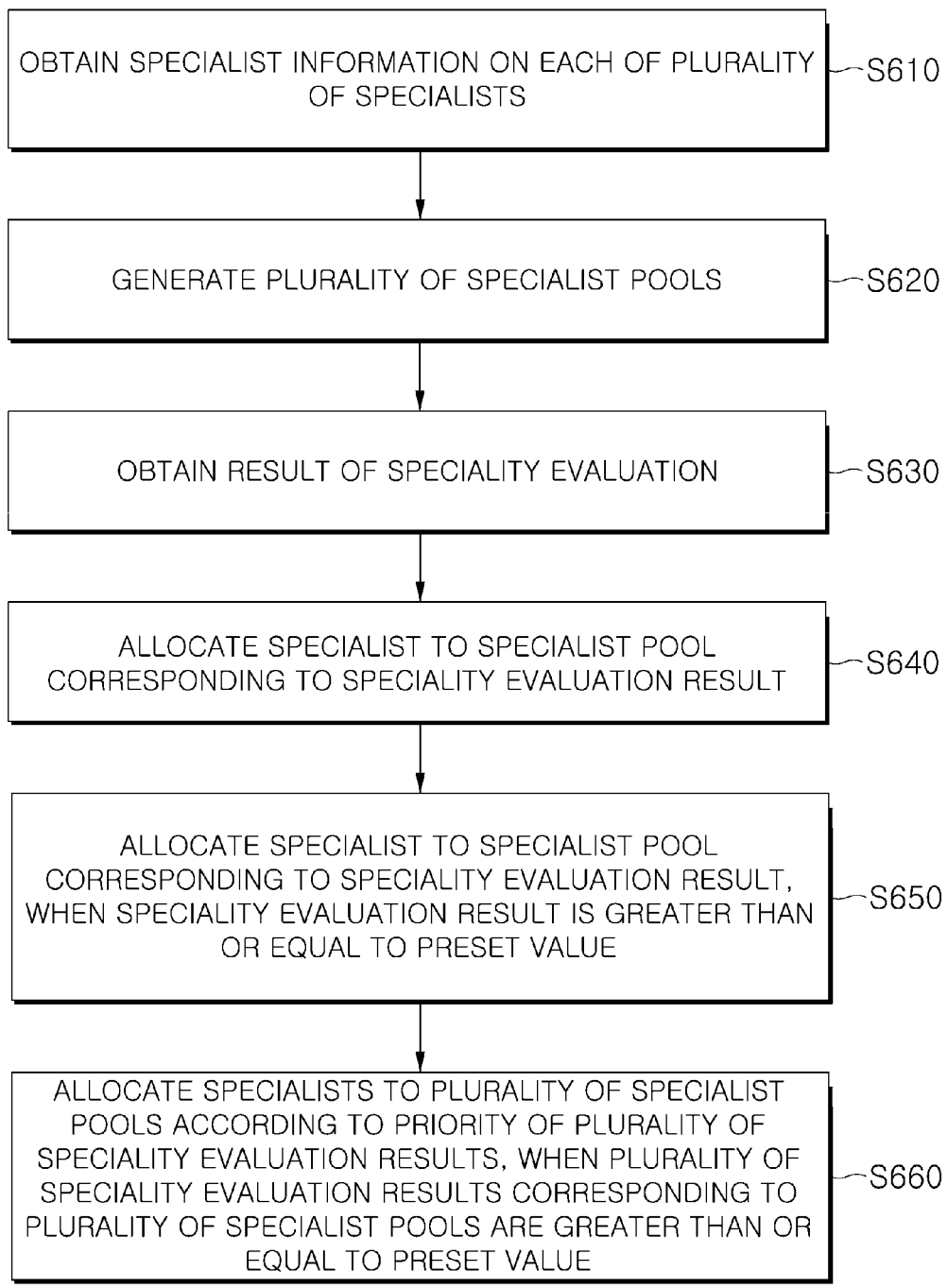
FIG. 10 is a flowchart illustrating a method of generating a specialist pool and a method of allocating specialists according to an embodiment of the present invention.

FIG. 10 is a flowchart illustrating a method of generating a specialist pool and a method of allocating specialists according to an embodiment of the present invention.

In step S610, the server 100 may obtain specialist information on each of a plurality of specialists.

In step S620, the server 100 may generate a plurality of specialist pools based on the plurality of obtained specialist information.

Specifically, by classifying a plurality of specialist information according to a preset classification criterion, the server 100 may generate a specialist pool. In an embodiment, the classification criterion may be a classification criterion obtained based on structured information included in specialist information. In this case, even in structured information, the importance of the information may be different. When a weight is obtained for the structured information, the server 100 may classify information on the specialist based on the structured information in which the weight is equal to or greater than a preset value.

For example, when the structured information for classification is a specialty field of the specialist, by obtaining structured and unstructured information related to the specialty field, the server 100 may classify the specialist information. That is, the server 100 may obtain a category for a specialty field (e.g., a legal category, an accounting category, etc.), and determine to which category the collected specialist information is related among the obtained categories to classify the specialist information.

In an embodiment, when there are two or more structured information for classification, the server 100 may classify specialist information in various methods. When the structured information for classification is a specialty field and career information, the server 100 may classify specialist information in consideration of both the specialty field and career. In this case, more detailed classification may be possible than a case where there is only one structured information for classification. For example, when the structured information for classification is one specialty field, the category is limited to a category by specialty field such as a legal category and an accounting category, but when the structured information for classification is a specialty field and career information, the server 100 may classify specialist information according to subdivided categories such as specialists with less than 10 years in a legal field, specialists with more than 10 years in a legal field, specialists with less than 10 years in an accounting field, and specialists with more than 10 years in an accounting field.

That is, the server 100 may classify a specialist pool according to various criteria as needed.

In an embodiment, when the specialist pool according to the present invention is a specialist pool for classifying MICE industry specialists, the server 100 may classify the specialist pool based on each industry field such as a meeting, an incentive trip, a convention, and an exhibition & an event.

In another embodiment, the server 100 may classify a pool of specialists by functional field such as planning, directing, production, operation, sales, and administration.

In another embodiment, the server 100 may classify the specialist pool according to a degree of experience retention of specialists according to a type of a project. Specifically, even specialists with the same experience in the same field may have a difference in project execution experience (know-how). For example, even a planning or directing specialist of the same career may have a degree of different know-how according to experience in domestic or overseas projects and the experience in projects as each organizer or orderer in the government, public institutions, local governments, companies, etc., and experience in projects for each scale of 100 million, 1 billion, or 3 billion in the field of exhibition.

In another embodiment, the server 100 may classify the specialist pool according to the degree of the specialist's reputation. Specialist information on the specialist's reputation may be obtained through various information such as activity awareness in the industry or a kind of the industry, SNS, etc., whether or not rebates, criminal records, and fraud records, or through letters of recommendation and supporting documents for the specialist.

Various embodiments described above are not individually used for classifying specialist pools, but may be used in combination. For example, the server 100 may classify the specialist pool using at least two criteria among specialists' field, function, presence or absence of experience and a level thereof, and reputation.

The server 100 according to various embodiments of the present invention may generate a pool of specialists using an artificial intelligence model.

Specifically, the server 100 may cluster the plurality of collected specialist information based on an artificial intelligence model. In this case, clustering may be achieved through various methods. According to various embodiments, various techniques such as K-mean clustering, mean-shift clustering, density-based spatial clustering, clustering using a Gaussian mixture model, and agglomerative hierarchical clustering technique may be applied to clustering according to the present disclosure.

In an embodiment, the server 100 may cluster specialist information using a K-mean clustering algorithm. Specifically, 1) when the set D of specialist information and the number k of clusters are input, the server 100 may randomly extract the k number of objects from the set D of specialist information, and set the k pieces of extracted specialist information to a centroid of each cluster. 2) The server 100 may obtain the k number of clusters based on the centroid of the cluster. Specifically, the server 100 may obtain a distance for each specialist information included in the specialist information set D and each of the k pieces of extracted specialist information, and determines to which centroid each specialist information has the highest similarity to obtain a cluster. 3) The server 100 may reset the centroid of the cluster based on the specialist information included in the obtained cluster, and reset the k number of clusters based on the reset centroid. That is, the server 100 may repeat a process of obtaining a cluster from a random centroid (the k number of centroids), recalculating the centroid of the obtained cluster to determine a new centroid, and obtaining a new cluster from the new centroid (the k number of centroids) until the centroid of the cluster does not change. Through the above method, the server 100 may obtain a cluster for input data. In the above-described embodiment, a method of obtaining a cluster through the K-mean clustering algorithm has been described, but the cluster may be obtained by various other methods such as a GMM algorithm.

The server 100 may obtain one or more clusters based on the clustering result.

In an embodiment, clusters having similar characteristics may be located closer to each other. Accordingly, the server 100 may determine an association between each cluster based on the distance. Specifically, by analyzing a distance between centroids of each cluster, the server 100 may obtain association information between clusters.

The server 100 may perform step of obtaining characteristics of the obtained one or more clusters.

Specifically, the server 100 may label the obtained cluster. That is, a cluster generated by the above-described clustering process is only a set of data having similar properties, and there is no information on which specialty field it is the specialist pool. Accordingly, the server 100 may analyze the cluster generated by clustering to perform a labeling process corresponding to the specialist pool.

In an embodiment, the server 100 may determine characteristics such as specialty fields, careers, and background information of specialists corresponding to each cluster.

The server 100 may generate specialist pools corresponding to each of the one or more clusters based on the obtained characteristics. The specialist pools generated therefrom include specialist pools classified based on various parameters based on an artificial intelligence model, unlike the traditional method of classifying specialists by specialty field or career, and in this case, a single specialist may belong to a plurality of specialist pools at the same time, and when there are parts that can be fused to each other between different specialty fields, a single specialist pool including all of them may be generated, or specialist pools having overlapping parts (intersections) may be generated.

Therefore, according to the purpose, information on specialists, belonging to different technical fields, but mutually common or capable of cooperating, may be easily obtained based on the specialist pool so that fusion between different technical fields is possible, and by performing matching accordingly, there is an effect of enabling a mix & match of various specialists who can respond to the era of the 4th industrial revolution.

In step S630, the server 100 may obtain the specialist's specialty field and specialty evaluation result based on the specialist information.

In step S640, the server 100 may allocate a specialist to at least one specialist pool of a plurality of specialist pools based on the specialty evaluation result.

Specifically, the step of allocating specialists to the specialist pool by the server 100 may include step of obtaining a specialist pool with the highest correlation with the specialist and step of determining whether to assign specialists according to the degree of specialty set to the obtained specialist pool.

In an embodiment, the server 100 may compare specialist information on a specialist with a plurality of specialist pools and allocate the specialist to the specialist pool having the highest association.

In the method of allocating specialists, the server 100 may evaluate the specialty of each specialist and assign the specialist to the specialist pool only when the evaluated specialty is a certain level or more. For example, even if a specialist is a specialist in the field of law, some specialists may have completed only a law degree (the result of the specialty evaluation will be low), and others may have various practical experience (the result of the specialty evaluation will be high). Accordingly, the server 100 may determine whether to allocate a specific specialist to the specialist pool based on the evaluated specialty.

In this case, the server 100 may match a plurality of specialists assigned to each specialist pool with the project.

In step S650, when the specialty evaluation result is greater than or equal to a preset value, the server 100 may allocate the specialist to the specialist pool corresponding to the specialty evaluation result.

Specifically, when the specialist's specialty is evaluated, the server 100 may determine a level of specialty set to the specialist pool. That is, even if a specific person has information on a specific field, when the specific person should not have specialty, the specific person should not enter the specialist pool. For example, because law students do not have a certain level of specialty, the law students should not be assigned to the specialist pool. Accordingly, the server 100 may evaluate the specialty of the specialist and assign the specialist to the specialist pool only when the specialty is equal to or greater than a preset value.

In this case, the level of specialty that the specialist pool should have may be determined through various methods.

In an embodiment, the level of specialty may be directly input by a user. However, because the measure of the level of specialty may not be an intuitively understandable measure by being specifically quantified, the server 100 may classify and provide the specialty of specialists such as a top specialist, an advanced specialist, and a general specialist based on the specialty of a plurality of specialists associated with a specific specialist pool. For example, assuming that 100 specialists are related to a first specialist pool, the server 100 may set the top 5% of specialists as top specialists, the top 15% of the specialists as advanced specialists, and the top 80% of the specialists as general specialists. In this case, the remaining 20% of specialists may not be assigned to the specialist pool.

In another embodiment, the level of specialty may be determined in relation to the difficulty of a work to be performed. That is, specialists assigned to the specialist pool are not fixed, but may be configured flexibly according to individual works. Considering that the purpose of establishing a specialist pool is to match specialists, for works with a clear direction and purpose, it is necessary to provide a specialist pool appropriate for the work. Therefore, the server 100 may receive information on a work to be provided (e.g., a work field, an amount of the order, a work content, a level of required specialty, a result of the previous work, and evaluation information, etc.), and determine the level of specialty to be applied to the pool of specialists based on the level of the provided work.

The level of specialty described above may be directly set by the specialist platform, but it is not limited thereto. That is, the level of specialty may be directly set by users of the platform requiring specialists (e.g., various organizations such as the government, local governments, public institutions, associations, companies, and specialists who need specialists for collaboration).

In step S660, when a plurality of specialty evaluation results corresponding to the plurality of specialist pools are equal to or greater than a preset value, the server 100 may allocate specialists to the plurality of specialist pools according to a priority of the plurality of specialty evaluation results. That is, one specialist may belong to a plurality of specialist pools, not one specialist pool.

Specifically, the server 100 may compare the result of specialty evaluation for a specific specialist with specialist information included in the plurality of generated specialist pools to allocate specialists to the plurality of specialist pools.

Specifically, when the plurality of specialty evaluation results corresponding to the plurality of specialist pools are equal to or greater than a preset value, the server 100 may allocate specialists to the plurality of specialist pools according to a priority of the plurality of specialty evaluation results.

That is, both a first specialty evaluation result for a first specialist pool and a second specialty evaluation result for a second specialist pool may be equal to or greater than a preset value. In this case, the specialist may be assigned to both the first specialist pool and the second specialist pool. However, the server 100 may compare the first specialty evaluation result and the second specialty evaluation result to determine a priority, and allocate the specialist to the specialist pool according to the priority. That is, even if the specialist is assigned to a plurality of specialist pools, the server 100 may preferentially allocate the specialist to the specialist pool with higher specialty.

The server 100 may not only perform a function of matching a project with the specialist, but also manage project data calculated by performing the matched project by the specialist. The server 100 may update the specialist's career information and specialty evaluation information using the project data to increase the accuracy of the next project matching or may grant rights such as copyright to the specialist when the project data satisfies a preset condition, or may help a work of specialists to use some of the generated project data in the next project.

Figure 11:
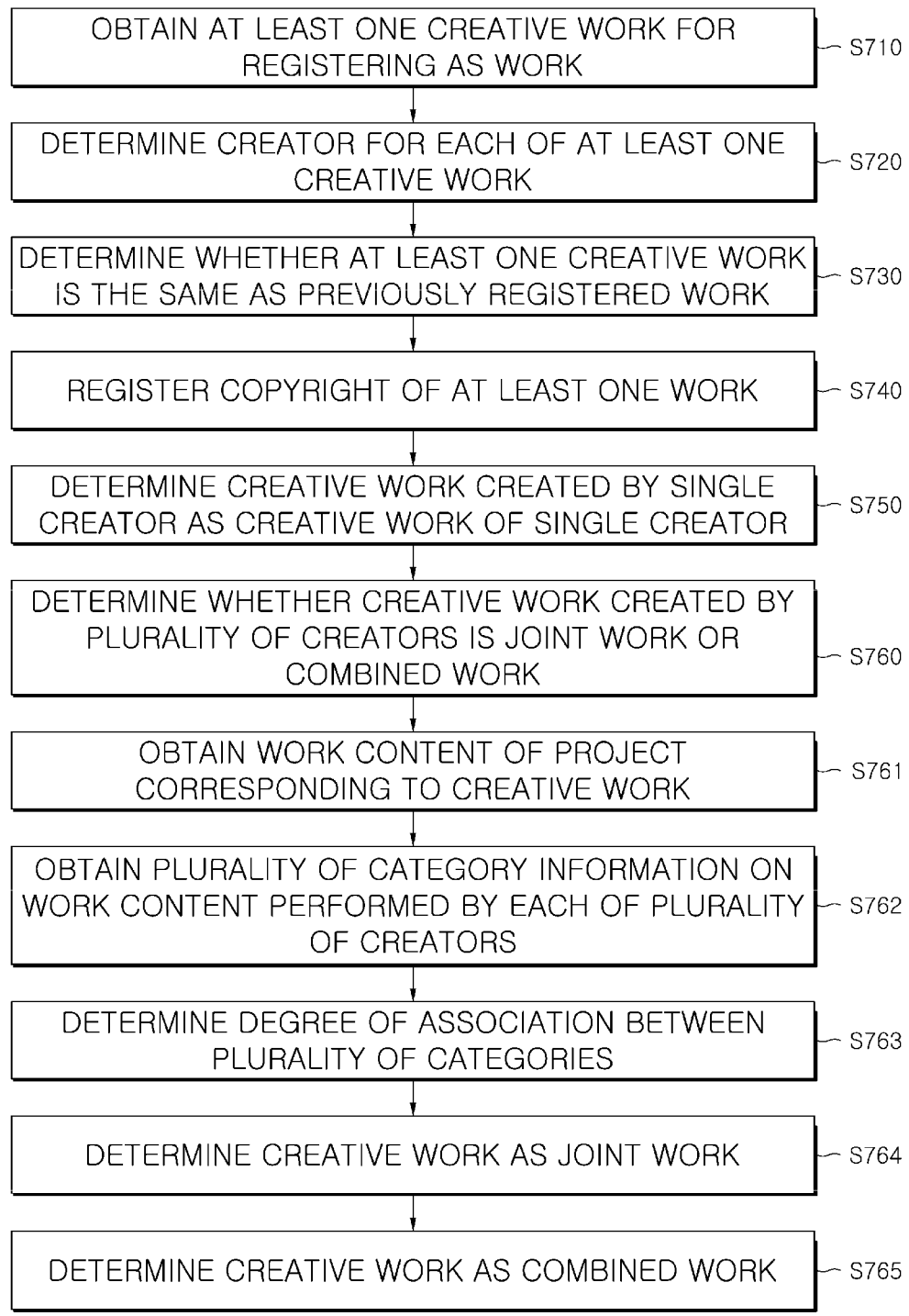
FIG. 11 is a flowchart illustrating a method of managing project data according to an embodiment of the present invention.

FIG. 11 is a flowchart illustrating a method of registering and managing project data as copyright according to an embodiment of the present invention. For convenience of description, in the embodiment of FIG. 11, a specialist who has calculated project data by performing a project may be named as a creator.

In step S710, the server 100 may obtain at least one work for registering as a work among the obtained project data.

In an embodiment, the server 100 may determine data that satisfies the requirements of a work among the project data and obtain data that satisfies the requirements as a creative work. Specifically, the server 100 may obtain data that includes human thoughts or emotions and that recognizes creativity as a creative work.

In an embodiment of a method of determining a work, the server 100 may obtain data generated by a specialist among project data. For example, the server 100 may obtain data excluding data (e.g., data related to a project including documents, images, videos, drawings, blueprints, graphics, etc., a format related to the project, background data related to the project, etc.) provided from a project registration subject among the project data.

In another embodiment, by analyzing data generated by the specialist, the server 100 may determine a degree of creativity. For example, when the data generated by the specialist is text data, the server 100 may determine a degree of creativity based on the weight of words related to emotion among text data and a connection relation between words related to the emotion. For example, the server 100 may form and store emotion-related words in a database, and determine a ratio in which words related to emotions stored in the database are included among text data generated by the specialist. When the text data generated by the specialist includes words related to emotions in a predetermined ratio or more, the server 100 may determine that the data is a creative work.

In another embodiment, the server 100 may obtain all sentences included in text data, and determine emotion information on each of the plurality of obtained sentences. For example, the server 100 may quantify emotion information of a corresponding sentence based on a connection relation between a word for emotion and a word for emotion included in the sentence. When the sentence in which the emotion information is quantified is greater than or equal to a preset value, the server 100 may determine the text data as a creative work.

As another example, when the data generated by the specialist is image data or video data, the server 100 may determine the data as a creative work. In general, images or videos will often express human thoughts or emotions that are a requirement of a work.

In step S720, the server 100 may determine a creator for each of at least one creative work.

In step S730, the server 100 may determine whether at least one creative work is the same as a previously registered work.

That is, because the acquired creative works are not all registered as copyrights due to a relation with other works, the server 100 may determine whether the acquired creative works are the same as the previously registered works.

In step S740, when at least one creative work is not the same as a previously registered work, the server 100 may register copyright of at least one work.

In the case of a work, it may be classified into an individual work created by an individual alone, a joint work created jointly by multiple people and that cannot be separated, and a combined work created jointly by multiple people but that can be separated. Accordingly, the server 100 may determine what kind of work the creative work is and set a share ratio or a contribution level of a plurality of copyright holders according to the determined type of work to enable to pay a fair compensation to each copyright holder.

In step S750, when the creator is a single creator, the server 100 may determine a creative work created by the single creator as a creative work of the single creator.

In step S760, when the creator is a plurality of creators, the server 100 may determine whether a creative work created by the plurality of creators is a joint work or a combined work.

In step S761, the server 100 may obtain a work content of a project corresponding to the creative work.

Figure 12:
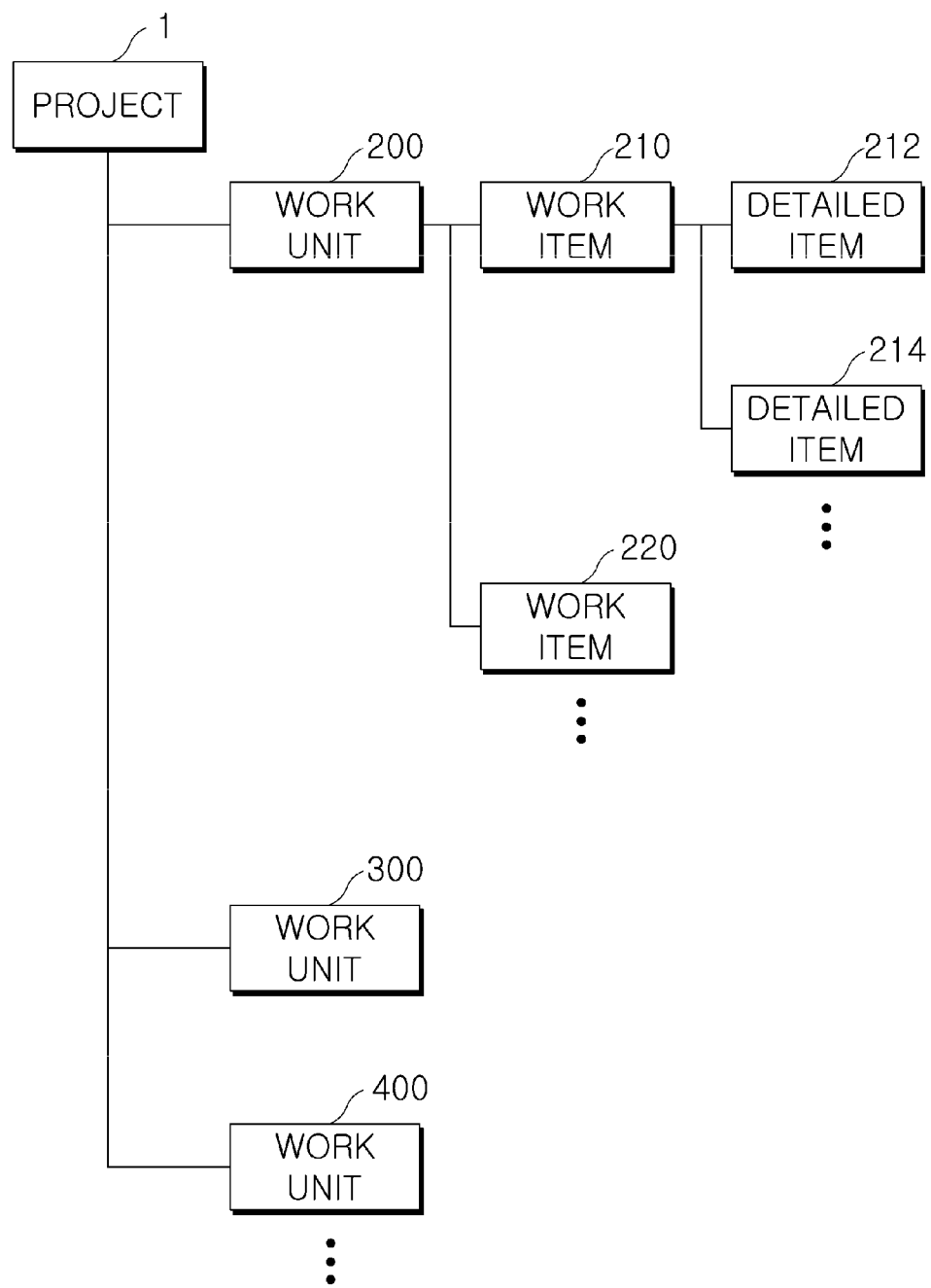
FIG. 12 is a diagram for explaining detailed classification of a project according to an embodiment of the present invention.

In this case, as illustrated in FIG. 12, a project 1 may be first divided into one or more work units 200, 300, and 400. For example, when the project 1 is for carrying out a specific event, the work units 200, 300, and 400 may include programs, food and beverage, space creation, operation, production, contracts, etc., but are not limited thereto.

Further, each of the work units 200, 300, and 400 may be further divided into one or more work items 210 and 220. For example, work items for a program work unit may include a time table, a cue sheet, a scenario, a moderator, a performer, a BGM, and other confirmation items, but are not limited thereto.

Further, each of the work items 210 and 220 may be further divided into one or more detailed items 212 and 214. For example, the performer-related work items may be divided into detailed items such as securing a performer contact point, checking clothes, props, and personnel, checking a waiting space, preparing other props, and rehearsing plans, but are not limited thereto. In this case, one detailed item may be divided to be one category. That is, data obtained by performing one detailed item may be configured with one work, and detailed items may be divided so as not to be configured with a joint work or a combined work. That is, a work obtained by performing one detailed item may be one work. However, the present invention is not limited thereto, and a work obtained by performing detailed items according to various embodiments of the present invention may be a joint work or a combined work.

In an embodiment, each of the divided detailed items is stored in different blockchain nodes, and may be managed to prevent forgery and falsification of at least some of the divided detailed items through interconnection.

That is, each block illustrated in FIG. 12 stores information thereof in different nodes (blocks) on the blockchain, and when some of them are forged and falsified, it may be verified through the entire blockchain and thus the integrity of the entire information may be verified.

Furthermore, the project execution results for detailed items may also be stored in different blockchain nodes.

The server 100 may determine a creator (specifically, a person in charge or the specialist) who will perform each of the divided detailed items. In an embodiment, the server 100 may determine a creator for each detailed item. However, according to an embodiment, one creator may perform a plurality of detailed items related to each other. Works assigned to creators may be assigned in units of a detailed item and in units of a work item, or may be assigned according to a work unit, but are not limited thereto.

One creator may perform part of one work item, and perform all or part of a plurality of work items. Accordingly, the server 100 may generate a work group including a plurality of detailed items. Regardless of a classification unit, the work group may be generated as a group including a plurality of related detailed items or detailed items in which a single creator may perform.

The server 100 may determine a creator who will perform each work group.

According to the embodiment, one detailed item may be performed by a plurality of creators. Therefore, according to the embodiment, there may be detailed items overlapping each other between different work groups.

Similarly, a work group may be performed by a plurality of creators. A method of generating a work group is not limited, and an intersection between different work groups may or may not exist, and may be in the same or inclusive relation.

The server 100 may determine a creator to perform a work according to each work group based on the nature of each work group.

In an embodiment, the server 100 may perform step of setting a work content, budget, and authority corresponding to each of the generated one or more work groups.

Further, the server 100 may perform step of allocating the preset work content, budget, and authority to each of one or more creators who will perform each of the one or more work groups.

Further, the server 100 may perform step of providing information corresponding to the assigned work content, budget, and authority to each of the one or more creators.

In an embodiment, a blockchain in which data on a project is stored and a blockchain in which information on a creator is stored may be provided, respectively.

The server 100 stores project data in a project blockchain and stores information on the creator in a creator blockchain, and exchanges and stores information on the matched project and creator in nodes corresponding to each other.

Accordingly, because matching information of the project and the creator is stored in the blockchain, and the information of the matched creator and project is doubly stored in each other's blockchain, there is an advantage that the two blockchains may interact, the integrity of the information may be verified and the information may be safely stored.

In an embodiment, the server 100 may determine whether a creative work according to a work content performed by an individual creator or a plurality of creators is for a work unit, a work item, or a detailed item.

In this case, the creative work may be classified into four data of 1) data obtained by performing a work unit or a work item by an individual creator, 2) data obtained by performing a detailed item by an individual creator, 3) data obtained by performing a work unit or a work item by a plurality of creators, and 4) data obtained by performing detailed items by a plurality of creators.

1) In the case of data obtained by performing a work unit or a work item by an individual creator, the server 100 may determine that the copyright for a creative work is the copyright of the individual creator. However, in this case, the server 100 may classify the creative work into a plurality of works by using a method of steps S762 to S765 to be described later.

2) In the case of data obtained by performing a detailed item by an individual creator, the server 100 may determine that a creative work for the detailed item is the copyright of the individual creator.

3) In the case of data obtained by performing a work unit or a work item by a plurality of creators, the server 100 may determine whether a creative work is a joint work or a combined work using a method of steps S762 to S765 described later.

4) In the case of data obtained by performing detailed items by a plurality of creators, the server 100 may determine that a creative work is a joint work of the plurality of creators. That is, even by steps S762 to S765 to be described later, because the creative work for a detailed item is a work for one category or a related category, the server 100 may determine that the creative work is a joint work of a plurality of creators.

Hereinafter, 3) in the case of data obtained by performing a work unit or a work item by a plurality of creators, a method of determining whether a creative work is a joint work or an individual work using steps S762 to S765 will be described.

In step S762, the server 100 may obtain a plurality of category information on a work content performed by each of the plurality of creators.

In this case, because the detailed items may be configured with one category, the server 100 may obtain a plurality of category information on the work contents performed by each of the plurality of creators who performed the work units or the work items.

In an embodiment, as illustrated in FIG. 12, when a plurality of creators perform the work unit 200, the server 100 may obtain category information corresponding to the detailed items 212, 214 . . . of the work unit 200 as a plurality of category information.

In step S763, the server 100 may determine an association between the plurality of obtained categories.

In step S764, when the determined association is equal to or greater than a preset value, the server 100 may determine the creative work as a joint work.

In step S765, when the obtained association is less than a preset value, the server 100 may determine the creative work as a combined work.

That is, the more closely related a plurality of categories are to each other, the higher the probability that the creative work is a joint work.

Therefore, when an association is greater than or equal to a preset value, the server 100 may determine that the creative work is not separable and determine the creative work as a jointed work, and when an association is less than a preset value, the server 100 may determine that the creative work is separable and determine the creative work as a combined work.

An association between a plurality of categories may be obtained through various methods.

In an embodiment, the server 100 may obtain a plurality of result data on the work content performed by each of the plurality of creators. In this case, the plurality of result data may mean data performed by the plurality of creators according to the assigned work content. That is, the result data generated by one creator may constitute a work, may constitute a plurality of works, or may be a part of a work.

By clustering a plurality of creative works, the server 100 may obtain a plurality of clusters. That is, the server 100 may group a plurality of works to group creative works of a similar category. In this case, the server 100 may cluster together not only a creative work, but also a work created from the creative work and a sub work for the work.

The server 100 may label a plurality of clusters with a plurality of category information for each of the plurality of clusters. That is, by determining characteristics of each of the plurality of clusters, the server 100 may label a category in the cluster. In this case, the category may be based on an expression method of the work, such as image, audio, and text categories, and may be the form of a work, such as language, music, play, art, architecture, photo, image, figure, and computer program categories and secondary work and edited work categories calculated from the above-described language, music, play, art, architecture, photography, video, and computer programs.

The server 100 may determine in which cluster each of the plurality of result data is included in a plurality of clusters corresponding to the plurality of category information. That is, by determining in which cluster the result data is included, the server 100 may determine to which category the result data belongs.

The server 100 may obtain an association based on distances between a plurality of clusters corresponding to each of the plurality of result data. For example, when first result data are included in a first cluster and second result data are included in a second cluster, the server 100 may obtain a distance between the first cluster and the second cluster, and determine an association according to the obtained distance. If the distance is far, the association will be low, and if the distance is close, the association will be high. In an embodiment, the server 100 may determine an association between a plurality of result data using not only a distance between clusters but also a distance between result data. As another embodiment, when the first result data and the second result data exist in the same cluster, the server 100 may determine an association between the first result data and the second result data as a maximum value that can be determined. In this case, a work for the first result data and the second result data may be determined as a joint work.

Figure 13:
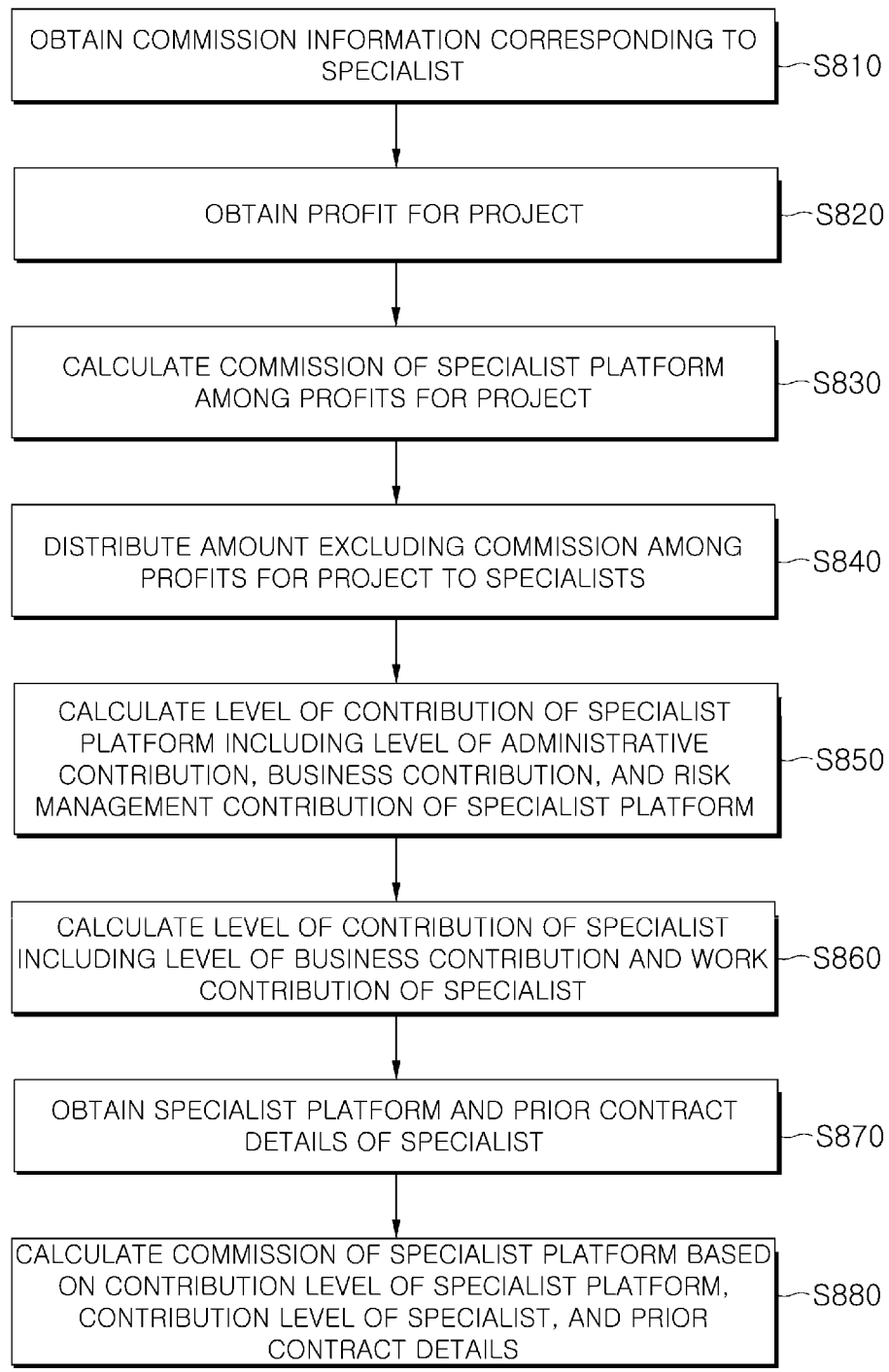
FIG. 13 is a flowchart illustrating a method of distributing a profit according to an embodiment of the present invention.

FIG. 13 is a flowchart illustrating a method of distributing a profit according to an embodiment of the present invention.

In step S810, the server 100 may obtain commission information corresponding to the specialist.

In this case, the commission may include a prepaid commission, a commission for a project execution profit, and a reject commission. In particular, the prepaid commission is a commission provided in advance to the specialist platform from specialists periodically or more than once before a profit distribution stage. For example, the prepaid commission may mean a membership fee or an annual membership fee, and according to the embodiment, the prepaid commission may also mean some kind of participation fee in which a specialist provides in advance to bid for a specific project or to participate in the project at a stage of project planning.

In step S820, the server 100 may obtain a profit for the project.

Specifically, the server 100 may obtain project data for a project performed by the specialist, subtract a commission from a profit generated therefrom, and distribute the remaining profit to the specialist. Further, the server 100 may receive a commission from a specialist and use the commission as a fund for obtaining and managing project information, such as a basic administrative work, a sales work, and a risk management work, and when the project generates profits, a portion of the profits may be distributed as profits. Specialists may receive profit distribution according to a type and method of participation in the project, role, contribution level, input period, and performance.

In step S830, the server 100 may calculate a commission of a specialist platform among profits for the project.

In step S840, the server 100 may distribute an amount excluding a commission among the profits for the project to specialists.

In step S850, the server 100 may calculate a level of contribution of the specialist platform including a level of administrative contribution, business contribution, and risk management contribution of the specialist platform.

In an embodiment, the server 100 performs not only an administrative work, but also a business work such as collecting business and project information or attracting investment, and also takes the role of taking risks due to sunk costs, business blanks, and accidents.

Therefore, in calculating a commission of the specialist platform, a level of administrative contribution according to an administrative work of the specialist platform, a level of business contribution corresponding to a cost incurred in the business work, and a level of risk management contribution according to risk management may be considered.

In an embodiment, the risk management contribution level may be calculated based on an expected loss according to a risk and an expected loss value calculated based on a probability of occurrence of the loss, but it is not limited thereto. For example, a commission according to the risk management contribution level may be understood as a concept of a reserve fund for risk. In this case, the commission according to the risk management contribution level may be weighted based on assets previously held by the specialist platform and expected profits from sales or orders. For example, as there are sufficient assets in the specialist platform, when the risk of sales expenses is not large, a commission for contributing to the risk may be set relatively low, and after an expected value is calculated based on an expected profit from sales or orders, the commission may be calculated by comparing the two expected values.

In step S860, the server 100 may calculate a level of contribution of the specialist including a level of business contribution and work contribution of the specialist.

In the case of specialists participating in the project, a contribution level according to the division of work may be calculated, and in some cases, the specialist may also directly conduct sales or provide assistance to sales. For example, specialists may make contributions, such as attracting investment through a network, helping to write proposals, providing information about projects and business, or introducing other specialists. Therefore, in calculating a commission of the specialist platform, in order to distinguish the share of the specialist platform and the share of the specialist, a level of administrative contribution, business contribution, and risk management contribution of the specialist platform may be considered, and in order to distinguish the share of the specialist, a level of business contribution and work contribution of the specialist may be considered.

In step S870, the server 100 may obtain the specialist platform and prior contract details of the specialist.

In step S880, the server 100 may calculate a commission of the specialist platform based on the contribution level of the specialist platform, the contribution level of the specialist, and the prior contract details.

The server 100 may finally calculate a commission rate of the specialist platform through weighting and adjustment according to the pre-contract details in addition to the contribution level of the specialist platform including the level of administrative contribution, business contribution, and risk management contribution of the specialist platform, and the contribution level of the specialist including a level of business contribution and work contribution of the specialist.

When there are a plurality of specialists who have performed the project, the server 100 may distribute profits among the plurality of specialists through various methods.

Specifically, in a process of calculating the commission of the specialist platform, the share of the specialist platform and the share of the specialist may be divided based on the level of business contribution and work contribution of the entire specialists, and then the share of the specialist may be distributed to each specialist based on the level of business contribution and work contribution of each specialist.

Further, the server 100 may perform step of calculating an individual contribution level of each of the specialists who have performed the project based on the level of business contribution and work contribution of each of the specialists who have performed the project.

That is, the server 100 may calculate an individual contribution level of each specialist based on the level of business contribution and work contribution of each specialist, the evaluation criteria for the level of business contribution and work contribution may be performed according to a preset criterion, and the weight assigned to the work contribution level may be set differently based on the work weight and difficulty.

Further, the server 100 may perform step of assigning a weight to the individual contribution level based on a career and history of each of the specialists who have performed the project.

In an embodiment, by assigning a relatively high weight to a level of contribution of specialists who are relatively difficult to independently perform a project, the server 100 may guarantee a minimum income for specialists with little experience.

In another embodiment, the server 100 may assign a relatively low weight to a work contribution level to a specialist with a lot of experience in consideration that a work performed by the specialist with a lot of experience has been assisted by a specialist with less experience.

In another embodiment, a relatively higher weight may be assigned to a work contribution level of a specialist with a large experience in consideration that there is the guidance and review of the specialist with a lot of experience in a work contribution level of a specialist with less experience, and a method of assigning a weight is not limited.

In an embodiment, the server 100 may obtain weights for a work contribution level based on career information of each specialist. Specifically, the server 100 may extract data related to project execution from data included in the career information, and obtain association information between the extracted data and the project to obtain weights for each specialist.

Further, the server 100 may perform step of distributing a profit to specialists who have performed the project based on the individual contribution level to which the weight is assigned. Such weight setting may be implemented through various methods.

According to various embodiments of the present invention, the server 100 may match a project with a specialist through various methods. According to an embodiment, the server 100 may be connected to a project terminal providing a project and a specialist terminal performing a project to match the project and the specialist. In this case, the project terminal may be a terminal corresponding to a project registration subject that orders a project, such as the government, local governments, public institutions, associations, and companies.

The specialist terminal uploads specialist information to the server 100, and the project terminal requests and receives specialist information corresponding to job information to and from the server 100. By communicating with the matching specialist through the server 100, the project terminal may perform a contract.

The contract information may be stored in the server 100, and results of business performance (e.g., working period, salary, performance, specialist evaluation, company evaluation, etc.) according to the contract may also be stored in the server 100.

Further, according to an embodiment, at least some of the information stored in the server 100 may be stored and managed in a blockchain. For example, at least some of company information, specialist information, contract information, and business execution results according to the contract may be stored in the blockchain to prevent forgery and falsification and to increase the reliability of a service provided by the server 100. That is, the server 100 may verify corporate information and specialist information based on information stored in the blockchain, and perform matching based on the verified information.

The server 100 may collect specialist information, verify the collected specialist information, store the verified specialist information in a database, obtain job information from the project registration subject, and match a specialist corresponding to job information among specialists stored in the database.

In an embodiment, the server 100 may extract one or more keywords from job postings uploaded by the project registration subject, or analyze the content using natural language processing (NLP), and match and provide specialists corresponding to the job postings, but according to an embodiment, the server 100 may search for, filter, and provide specialists based on search information or filter information input by the project registration subject. In another embodiment, the server 100 may provide specialists' information to the project registration subject through a web page or an application. The server 100 may provide information on specialists found and organized based on information input from the project registration subject, but select specialists' information recommended or registered in real time through a web page or a main page or a pop-up page of an application to provide the selected information to the project registration subject.

In matching projects and specialists, the specialists may have a plurality of specialty fields. In some cases, there may be a case where the specialist wants to select a project excluding a specific specialty field among a plurality of specialty fields thereof.

For example, a particular specialist may be evaluated as having specialty in both development and design. However, the specialist may want to focus only on a design work, not a development work. In this case, the specialist may request to delete the development work from a specialty field thereof or may select only the design work as a specialty field.

In an embodiment, the server 100 may select one or more specialty fields of each specialist, but also obtain not only information on a specialty field that can be done and a specialty field that cannot be done from each specialist, but also information about specialty fields that they want to do and specialty fields that they do not want to do.

For example, a particular specialist may have little or no specialty in a specialty field, but may want to experience a work in that field. In this case, the server 100 may perform job information matching based on the specialty field desired by the corresponding specialist.

In an embodiment, each specialist's ability value may be evaluated as a numerical value. However, each specialist's ability value may be adjusted according to individual choices. For example, when it is evaluated that a specific specialist's development ability value is 50 and that a design ability value thereof is 40 and that a planning ability value thereof is 30, a total ability value of the specialist may be evaluated as an average of 40.

The server 100 may perform matching on job information based on the total ability value and detailed ability value of the specialist, and match a specialist with a high specific ability value according to the content of the job information, and match a specialist in which the overall ability value or the balance of the ability value is good.

According to the embodiment, the server 100 may delete (or set to 0) or blind a specific ability value according to the request of the specialist. In this case, job information requesting the corresponding ability value may be excluded from a matching target.

As another example, even though a specialist has a design ability of 70 but a development ability of 10, the specialist may want to perform a development work. In this case, when the design ability of the specialist is blinded, the total ability of the specialist may be evaluated as 10. However, instead of completely blinding other ability, the specialist may determine a disclosure level of the corresponding ability values. For example, the specialist may increase a value thereof by assisting a design work instead of allowing to perform a development work despite lack of a development ability. For example, by setting a disclosure level of a design ability to 50%, the specialist may request to match to a design ability of 35 and a development ability of 10.

The ability value setting and a matching method based thereon are not limited thereto, and according to embodiments, various search methods, ability value setting methods, and search result filtering methods may be applied.

According to various embodiments of the present invention, the specialist-project matching method when a specialist who performs a project is a freelance specialist will be described hereinafter.

The server 100 may perform steps of obtaining job information for finding freelancers, extracting a freelance specialist matching to job information from specialists stored in a database, obtaining a work performance history and work schedule of a freelance specialist, obtaining an expected work schedule of the freelance specialist by comparing the obtained work performance history and work schedule information of the freelance specialist and a request schedule included in the job information, estimating a work processing completion degree of the freelance specialist according to the expected work schedule based on the work performance history, and matching a freelance specialist whose work processing completion degree is equal to or greater than a preset reference value to job information.

For example, the specialist matching method according to the disclosed embodiment may be used for providing a service for matching and entrusting an outsourcing work to freelance specialists. The freelance specialist receives an outsourcing work entrusted in the form of a task, and performs and delivers the entrusted scope of work within a period. In this case, the number of works in which each freelance specialist can entrust is not limited, and the works may be entrusted and processed by the judgment of an individual. However, in this case, a work of an amount that exceeds the individual's ability may be entrusted, and in this case, the work may not be completed within the period or a quality of the work may be degraded to meet the period.

Accordingly, the server 100 may determine a work processing speed of the freelance specialist based on the existing work performance history of the freelance specialist and obtain a current work schedule to determine a current work amount.

The server 100 may generate a work schedule expected when a work is entrusted to the freelance specialist based on a type and amount of a work to be entrusted to the freelance specialist, and estimate a completion degree of the work processing of the freelance specialist based on the work schedule. For example, when it is determined that the freelance specialist cannot process the work within normal working hours according to the expected work schedule, the degree of completion of the works may be predicted to decrease.

According to the embodiment, the freelance specialist usually works for 8 hours a day, but may work for 10 hours a day when there is a lot of work. The server 100 may also obtain information on whether a completeness degree of the work does not decrease, even if the freelance specialist works up to several hours a day based on the work history.

Further, each freelance specialist may pre-enter a range of hours per day in which a work can be performed. For example, depending on the person, there may be people who only want to perform a work less than 6 hours a day, and when there is a lot of work, there may be people who can perform a work more than 10 hours a day. Accordingly, the server 100 may generate and evaluate an expected work schedule based on the range of work hours previously input by the freelance specialist.

Further, the server 100 may obtain information on how many hours a day each specialist may work without deteriorating a completion degree of the work according to the completion degree of the work performed based on this.

The server 100 may determine whether each specialist can perform a work within the maximum working time per day without deteriorating the work completion degree based on the obtained information, determine whether each specialist has completed the work within a time period based on the expected work schedule, and match a freelance specialist who can perform the work to job information as a result of the determination.

According to an embodiment, the server 100 may obtain a personal schedule of a freelance specialist and obtain information about a time in which a work may be performed substantially based on the obtained personal schedule. For example, when the specialist has a personal schedule, the specialist will not be able to perform a work during that time, and thus the server 100 may obtain an actual work available time of the specialist with reference to this, generate an expected work schedule based on this, and evaluate the possibility of performing a work of the specialist.

According to various embodiments of the present invention, a method of obtaining a resume from specialist information provided by a specialist to the server 100 for project matching and summarizing the obtained resume will be described hereinafter.

The server 100 may perform steps of obtaining a resume included in the matched specialist information, extracting a portion associated with job information from the obtained resume, extracting a portion different from other resumes stored in the database from the obtained resume, extracting a portion associated with the job information, extracting one or more keywords from each of the portions extracted in the steps of extracting a portion different from the other resumes, generating a summary of the resume based on the extracted keywords, and providing the generated summary to the project registrant subject.

In an embodiment, each project registration subject may wish to save a time required to review each resume uploaded by specialists, and to obtain information omitted in a process of reviewing the resume within a short time.

In the present specification, the resume does not mean a specific form, and it is understood as a meaning encompassing all forms of specialist information according to the disclosed embodiments.

The server 100 may extract a resume from specialist information and extract parts related to each job information. That is, unlike the case where the specialist submits a resume to the project registration subject, because the project registration subject searches for specialists, the server 100 may extract a part associated with job information of each project registration subject from specialist information (resume) of each specialist.

For example, the related part may mean background information and career information that can prove a specialty field of each job information, but it is not limited thereto.

Further, the server 100 may extract characteristic parts of a resume. For example, by comparing a resume included in the corresponding specialist information with resumes of other specialists stored in a database, the server 100 may extract different parts. A common part of the resume may be a general description content or may be a part difficult to express the characteristics of the specialist. Accordingly, the server 100 may extract contents different from other resumes or included in other resumes with a low probability or ratio.

The server 100 may generate a summary of a resume based on the extracted contents, highlight a part of a full text corresponding to the summary, and highlight major keywords in the summary.

The server 100 may organize the generated summary and provide the summary to the project registration subject, and there is an advantage that the project registration subject may select and specifically review information on a desired specialist while checking the summary.

In matching the project and the specialist, the server 100 may match a project and a specialist through various methods according to the type of the project.

In an embodiment, the server 100 may perform steps of determining one or more specialists to perform the project, determining a work to be performed by each of the one or more specialists, and transmitting information for managing the project to a node on a blockchain based on the steps of obtaining project information, classifying works to be performed of the project, determining a type of the project, the classified work, and a type of the project.

Specifically, the server 100 obtains information on a project. Project information may be obtained from the project registration subject, or may be obtained from project information previously registered in another server or a manager terminal, but it is not limited thereto.

Further, the server 100 may obtain work contents included in the obtained project. The server 100 may classify the obtained work content stepwise and hierarchically, and the classification of the work content may be performed based on an execution time point of the work, a content or type of the work, a subject (or expected subject) capable of performing the work, and a type thereof.

Classification of the work content may be performed by the server 100, but may be preset and stored in project information.

For example, the server 100 may classify the work content into one or more groups based on the work content included in the project information, and classify the work content hierarchically and stepwise. Criteria for classifying the work content may include a work content, an amount of the work, a budget, the number of necessary specialists, an execution time point of the work, etc., and different classification criteria may be applied according to the classification step in hierarchical classification.

Further, after the work content is classified, a specialist for each work may be selected, but after the specialist is selected, the work content may be classified based on the works in which each specialist can perform.

The server 100 may determine a specialist based on the classified work content and the type of the project, and allocate and manage a work to each specialist.

For example, the type of the project may include a joint support method and an individual support method, and other types of the project may include a project for event progress, a project for producing or importing and supplying a specific product, a complex project, a long-term project, a short-term project, a domestic project, an international project, a size of the project, and a budget scope of the project, but are not limited thereto.

The server 100 may determine a type of specialists to perform the project, the number of specialists for each type, and a configuration of specialists based on the project information and types. For example, even for the same type of work, there may be a plurality of specialists who jointly perform works, and there may be specialists who lead the work and specialists who assist the work, i.e., the configuration of specialists may be set in various ways.

In this case, the information for management of the project transmitted to the node on the blockchain may include at least one of a name of the project, a registration subject of the project, a period of the project, a type of the project, a work content of the project, a budget of the project, the number of specialists who perform the project, a configuration of specialists who perform the project, a type of project specialists, a name of project specialists, project execution results, evaluation of project execution results, and feedback contents and information.

In this case, the server 100 may perform steps of obtaining information on the execution result of the project, evaluating the project execution result, providing feedback according to the evaluation result to the specialist, and transmitting the project execution result and the feedback to a node on the blockchain.

In this case, in the step of obtaining the project information, the server 100 may perform step of verifying the integrity of the obtained project information based on the information stored in the blockchain, and in the step of determining the specialist, the server 100 may perform step of verifying the information on the specialist based on the information stored in the blockchain and step of assigning the specialist to the project based on a smart contract when the project information and the information on the specialist satisfy a preset condition.

In this case, in the step of classifying the work of the project, the server 100 may perform steps of classifying a work unit of the project, setting a work item of each of the work units, and setting detailed items of each of the work items, and in the step of determining the specialist, the server 100 may perform steps of generating one or more work groups including the one or more detailed items, determining one or more specialists to perform each of the generated one or more work groups, and transmitting information on the determined specialist to a node on the blockchain.

In this case, in the step of determining the specialist, the server 100 may perform steps of setting a work content, budget and authority corresponding to each of the generated one or more work groups, allocating the preset work content, budget, and authority to each of one or more specialists to perform each of the one or more work groups, providing information corresponding to the assigned work content, budget, and authority to each of the one or more specialists, and transmitting information corresponding to the assigned work content, budget, and authority to a node on the blockchain.

In this case, in the step of determining a type of the project, the server 100 may determine the type of the project, but the type of the project includes at least one of a joint support method and an individual support method, and in the step of determining the specialist, the server 100 may perform steps of generating a bid announcement including information on the project type determined in the step of determining the type of the project and information on the one or more work groups, obtaining bidding information corresponding to the bid announcement, selecting one or more bid information of the obtained bid information, and determining one or more specialists corresponding to the selected bid information, and in the step of selecting the one or more bid information, when the determined project type is a joint support method, the server 100 may perform step of selecting bidding information including execution plans for all of the one or more work groups, and when the determined project type is an individual support method, and when the project includes a plurality of different projects, the server 100 may perform step of selecting a plurality of bidding information including an execution plan for at least a part of the one or more work groups, but step of enabling the plurality of selected bid information to include execution plans for all of the one or more work groups, and when the plurality of selected bid information includes an execution plan for a work group overlapping with each other, the server 100 may perform step of selecting one of the overlapping bid information and for the bid information that is not selected, the server 100 may perform step of selecting and processing only the remaining work group other than the overlapping work group.

In the present embodiment, the joint support method refers to a method in which one or more specialists jointly bid for a project, and the individual support method refers to a method in which each specialist bids for a project.

According to various embodiments, the server 100 may perform step of generating a bid announcement including information on the determined project type and information on the one or more work groups.

Further, the server 100 may perform step of obtaining bidding information corresponding to the bidding announcement.

Further, the server 100 may perform step of selecting one or more bid information among the obtained bid information.

Further, the server 100 may perform step of determining one or more specialists corresponding to the selected bid information.

In an embodiment, the server 100 may set in advance a relation between a plurality of specialists performing a project, and for example, this may include a joint support method and an individual support method, but it is not limited thereto.

The server 100 may generate a bid announcement based on a type and bidding method of such a project, and share and distribute the generated bid announcement through a network. Further, the server 100 may collect bidding information corresponding to the bidding announcement, select one or more bidding announcements thereof, and determine a specialist corresponding thereto.

According to an embodiment, the server 100 may search for specialists corresponding to the bid announcement information, and provide specialist information matching to the bid announcement to the project registration subject. That is, the server 100 may match one or more specialists appropriate for a project based on various information such as background information and career information of specialists stored in the database, and provide information on the matched specialists to the project registration subject.

According to various embodiments of the present invention, the server 100 may match one or more registration subjects appropriate for a specialist based on information on a registration subject and a project stored in the database, and provide information on registration subjects and projects matched to the specialist.

For example, the server 100 may divide a project into one or more work groups based on the project information, and select one or more specialists matching to each of the divided work groups.

In another embodiment, the server 100 may select one or more specialists matching to at least a part of the project information based on the project information. The server 100 may divide project information into one or more work groups based on a range of works in which the selected specialists can perform, and allocate the classified works. When there is a work in which the selected specialists cannot perform, the server 100 may additionally select another specialist who can perform the work.

When works that can be performed between different specialists are overlapped, by evaluating the association, feasibility, and specialty between different specialists and overlapping works, the server 100 may assign the work to a specialist evaluated to be better. For example, the server 100 may assign the work to a specialist who has the ability to perform the work better or may assign the work to a specialist who has resources that may perform the work.

Whether each specialist has a resource capable of performing a work may be determined based on a history of work execution performed by each specialist so far. For example, the server 100 may evaluate resources (e.g., manpower and time, etc.) in which the specialist needs to perform each work, and evaluate whether the specialist has resources to perform the work based on the current work schedule of the specialist.

In this case, the resource may include data (e.g., career, experience, academic background, qualifications related to the corresponding field) that meets the quantitative and qualitative conditions required by the evaluation record of the outcome of the project previously performed by the specialist, the proposal request provided by the registration subject, or to be the basis of specialty.

In an embodiment, when the resource of the specialist is changed, the server 100 may include a process of updating the changed resource. For example, when the manpower, capital, credit, etc. of the specialist (individual or company) are changed or when the specialty of the manpower included in the specialist is updated, the server 100 may update the changed resource.

In an embodiment, when it is determined that the work is a work that exceeds resources of the corresponding specialist, the server 100 may evaluate the possibility of performing the work according to an intention of the corresponding specialist. For example, when the specialist has registered in advance that it is possible to do overtime up to 10% of the resource, if the work does not exceed 10% of the resource of the specialist, the server 100 determines that the specialist may perform the work, but a predetermined penalty is given to a work exceeding 100% of the resource and thus the server 100 may evaluate the work as a work in which the completion degree of the work is relatively inferior. When different specialists compete, even if one specialist is penalized by exceeding resources, the overall evaluation score may be higher than that of the other specialists. Therefore, by evaluating resources of each specialist, the server 100 may evaluate the possibility of work performance, and even if the work can be performed, by predicting a quality of work, the server 100 may determine whether to grant a penalty and assign the work to the most suitable (e.g., receiving the highest evaluation score) specialist based on the final evaluation result calculated therefrom.

Further, in the case of a work that exceeds 10% or more of the resource of the corresponding specialist, it may be evaluated as impossible to perform the work.

In this case, the joint support method includes at least one of a joint implementation method and a shared implementation method, and when the determined project type is a joint implementation method, the server 100 may perform steps of generating specialist group information including the one or more specialists, providing information for project execution to the one or more specialists, and obtaining information on the execution result of the project from the one or more specialists, and the step of evaluating the project execution result may include steps of obtaining information on the project execution result of each of the one or more specialists included in the specialist group, obtaining information on a performance work of each of the one or more specialists, a budget usage history, and collaboration items between the one or more specialists from the project execution result of each of the one or more specialists, determining a correlation between the one or more specialists based on the obtained information on collaboration items, and determining whether the joint contract of the specialist group is adhered based on the correlation determination result.

When the determined project type is a joint support method, the server 100 may perform step of selecting bidding information including execution plans for all of the one or more work groups.

Further, when the determined project type is an individual support method, the server 100 selects a plurality of bid information including an execution plan for at least one of the one or more work groups, but the plurality of selected bid information may include an execution plan for all of the one or more work groups.

Further, when an execution plan for a work group overlapping with each other is included in the plurality of selected bid information, the server 100 may perform step of selecting one of the overlapping bid information.

Further, for the unselected bid information, the server 100 may perform step of selecting and processing only the remaining work groups, except for the overlapping work group.

According to various embodiments, the server 100 may determine that there is no specialist appropriate for a performance work for the work group in which bidding information has not been selected, or that the applied specialist has failed because it does not meet the project information criteria.

In the present embodiment, the joint support method refers to a method in which one or more specialists jointly bid for a project, and the individual support method refers to a method in which each specialist bids for a project.

That is, the server 100 may disclose a bid announcement including information on each work group, and collect execution plan information corresponding to the bid information from specialists.

For example, in the case of a joint support method in which one joint contractor performs bidding, the server 100 may select bidding information including bidding information on the entire work group included in the project (i.e., including specialist information on the entire work group).

Further, in the case of an individual support method in which a plurality of individual specialists each conduct bidding, the server 100 may collect bidding information on each of work groups included in the project, but may select bidding information so that bidding information on the entire work group included in the project may be obtained when the collected bidding information is combined. In an embodiment, as described above, a project to which the individual support method is applied may be a case where one project is configured with several detailed projects.

In the case of the individual support method, there may be bidding information on overlapping works (or work groups) between different specialists. For example, a case may occur where a project includes detailed projects of a project A, a project B, and a project C, and that a first specialist bids for the projects A and B, and that a second specialist bids for the projects B and C. In this case, the project B may be an overlapping work performed by the above-described different specialists.

In this case, the server 100 may select a specialist more suitable to perform the corresponding work, and notify an unselected specialist of some selection processing and selection results for the remaining non-overlapping works. For a method of selecting specialists for overlapping works, the above-described method is used. For example, the server 100 may select a first specialist to perform a project A and a project B, and select a second specialist to perform a project C.

When the determined project type is a joint support method, the server 100 may perform step of generating specialist group information including the one or more specialists.

Further, the server 100 may perform step of providing information for performing the project to the one or more specialists.

Further, the server 100 may perform step of obtaining information on the execution result of the project from the one or more specialists.

Further, the server 100 may perform step of evaluating the obtained project execution result.

Further, the server 100 may perform step of providing feedback according to the evaluation result to the one or more specialists.

In an embodiment, in the case of a project of a joint support method, all specialists perform the project as a single community (however, in this case, in a joint implementation method, all specialists are jointly responsible for the responsibilities, and in a shared implementation method, all specialists are individually responsible for the responsibilities). Accordingly, the server 100 may generate specialist group information including all specialists, and exchange information for project management.

For example, the server 100 may provide information and budget for executing the project through one or more specialists.

Similarly, in this case, the server 100 may entrust a work of scheduling and managing a performance schedule for detailed items of works included in the project to the specialist group, review the progress through information obtained from one or more specialists, and provide feedback thereto.

The server 100 may perform step of obtaining information on a project execution result of each of one or more specialists included in the specialist group.

Further, the server 100 may perform step of obtaining information on works performed by each of the one or more specialists, budget usage details, and information on the collaboration between the one or more specialists from the project execution results of each of the one or more specialists.

Further, the server 100 may perform step of determining a correlation between the one or more specialists based on the information obtained in the step.

Further, the server 100 may perform step of determining whether the specialist group adheres to a joint contract based on the determination result of the step.

As part of the project progress management method, the server 100 may determine a substantial relation between a plurality of specialists, and determine whether a joint contract is adhered therefrom.

For example, the purpose of a joint contract is to allow a plurality of specialists perform works under responsibility using their resources in their respective fields of specialty, and to ensure that all members effectively exert their skills and experiences as one unit in the process.

Nevertheless, in practice, when one specialist does all the work and the other specialist lends only a name or performs only a simple work or when at least some of the specialists become brokers to win projects, receive commissions, and hands over a work to other specialists, and when a work is performed in the form of a subcontract between specialists instead of the form of a joint contract, there may be unfaithful work execution or collusion outside the purpose of the joint contract and thus there may be a problem of hindering the development of specialists.

These problems are difficult to audit in the form of a joint contract, but in the disclosed embodiment, the server 100 may collect information from specialists and analyze the information to easily monitor the information.

For example, the server 100 may obtain information on a work actually performed by each specialist and evaluate the authenticity of the obtained information. For example, the server 100 may cross-verify information collected from different specialists, or determine whether contradictions occur (overlapping or omission) when works performed by all specialists are combined, and determine whether each specialist has been performed a work that can actually perform based on background information of each specialist.

In another embodiment, the server 100 may register a person in charge for each business unit of a project. The person in charge may monitor an execution process of the person's work based on the previously calculated promotion schedule, division of duties, and outputs calculated based on the promotion schedule and division of duties. The server 100 may obtain information on a work performed by a specialist based on various data obtained through the person in charge, evaluate the authenticity of the obtained information, or evaluate a work performed by the specialist.

Further, by collecting information on collaboration between different specialists, that is, information on jointly performed works, minutes of meetings, exchanged mails, instructions, etc., the server 100 may evaluate whether the specialists are actually jointly performing works.

Further, it is also possible to obtain users of the budget based on the current state of use of each budget, and to determine whether each budget is for a work actually assigned to the user (specialist).

Thereby, the server 100 may evaluate the correlation (the relation in charge of actual work) between specialists, thereby evaluating whether the joint contract is adhered.

Further, a method of evaluating execution results according to the disclosed embodiment may be used for evaluating each specialist and specialists included in each specialist. In the present specification, a specialist means a person with specialty capable of performing a work in a specific field, but is not limited to a specific criterion for determining the specialist, and in a broad sense, it may be understood that the specialist is also meant to encompass all kinds of manpower.

For example, as a result of evaluation for a specific project, verification on whether each specialist has actually performed a work and evaluation of the execution result may be included. Further, information on specialists who have actually participated in the project within each specialist may also be obtained.

The server 100 may allocate evaluation information to specialists who participated in each project based on the execution results of the project. As an example, the server 100 may generate and allocate evaluation results of each specialist based on information on a processing work of each specialist participated in the project and provide the evaluation results for the project itself or the work performed by the corresponding specialist within the project to the specialist. In an embodiment, the server 100 may provide an evaluation result corresponding to each work to each specialist. According to various embodiments, all evaluation results for the project may be provided to all specialists.

The server 100 may evaluate a specialty field of each specialist and specialty in each specialty field based on the evaluation information on each specialist, and utilize evaluation information in various fields.

For example, in providing information on specialists to a company based on the specialist matching platform, the server 100 may verify the actual experience of each specialist based on the evaluation information, evaluate an actual specialty field based on the verified actual experience, provide information on the specialty of each specialty field to the company, and automatically match a specialist who wants to find a job in response to a job offer request of the company based on the provided information. In this case, the company may be various subjects such as the government, local governments, public institutions, cooperative organizations, and private companies.

Further, in matching specialists appropriate for a project according to the disclosed embodiment, by collecting information on a specialty field and specialty of specialists included in each specialist, the server 100 may evaluate each specialist.

In this case, even if the career, reputation, and infrastructure of the specialist (e.g., specific company) is insufficient, when it is determined that specialists belonging to the specialist have high specialty, the project and works belonging to the project may be matched to the specialist. For example, when specialists with a lot of career start a new company, even though the company's career is insufficient, the specialty of the specialists is high and thus matching may be performed based on an actual execution ability without disadvantage in project matching.

According to various embodiments, when the determined project type is an individual support method, the server 100 may perform step of classifying information for performing the project for each of the one or more work groups.

Further, the server 100 may perform step of providing the classified information to each of one or more specialists who will perform each of the one or more work groups.

Further, the server 100 may perform step of obtaining information on the execution result of each of the one or more work groups from each of the one or more specialists.

Further, the server 100 may perform step of generating the execution result of the project by collecting the obtained execution result.

Further, the server 100 may perform step of evaluating the generated project execution result.

Further, the server 100 may perform step of generating feedback for each of the one or more specialists based on the evaluation result.

Further, the server 100 may perform step of providing the feedback to each of the one or more specialists.

In an embodiment, the server 100 may schedule and manage the progress of the entire project based on a schedule previously set by an orderer or a client or a promotion schedule prepared by the specialist. For example, the server 100 may perform a schedule for performing each work group and detailed items included therein based on a schedule previously set by an orderer or a client or a promotion schedule prepared by any one of a shared performer, a joint performer, and an individual performer and provide necessary information to each specialist.

Further, the server 100 may collect and combine the execution results of each work from each specialist and determine the progress of the entire project.

By generating feedback to be provided to each specialist based on the result of determining the overall project progress, and providing corresponding feedback to each specialist when there is a problem in the project progress, the server 100 may manage the project progress.

Figure 14:
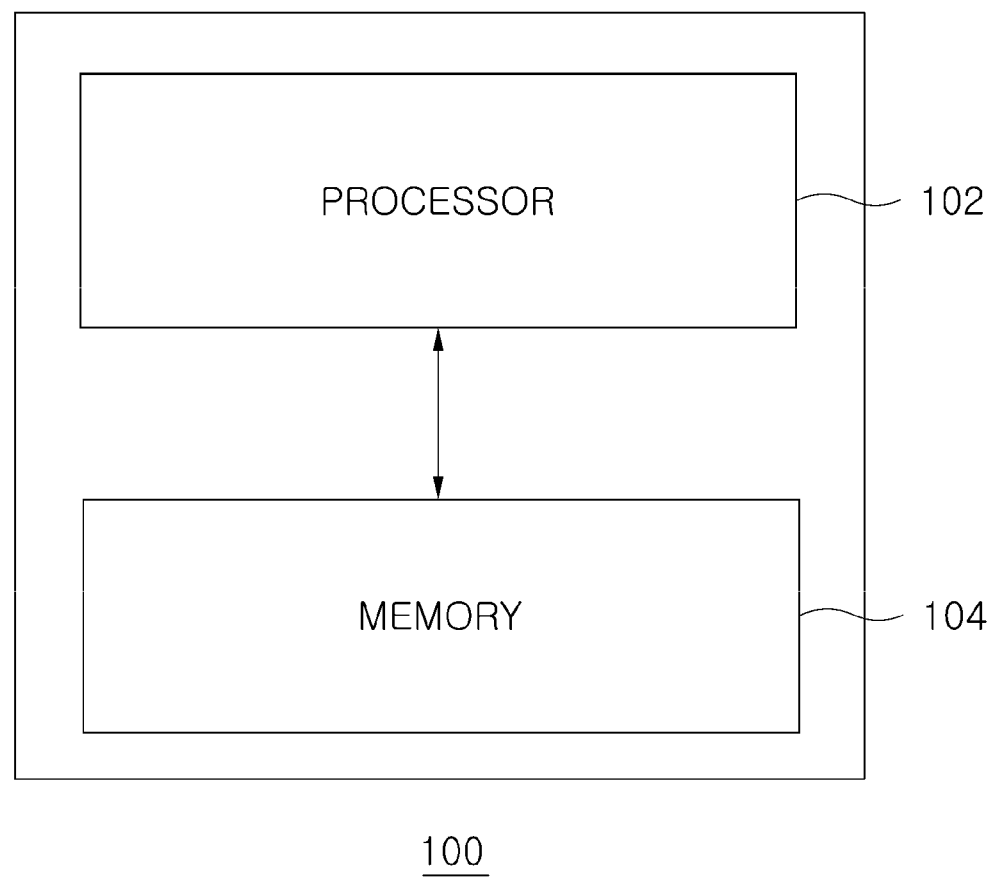
FIG. 14 is a block diagram of a device according to an embodiment of the present invention.

FIG. 14 is a block diagram of a device according to an embodiment of the present invention.

A processor 102 may include one or more cores (not illustrated) and a graphic processing unit (not illustrated) and/or a connection path (e.g., bus) for transmitting and receiving signals to and from other components.

The processor 102 according to an embodiment performs the method described with reference to FIGS. 1 to 13 by executing one or more instructions stored in a memory 104.

For example, the processor 102 may obtain new learning data by executing one or more instructions stored in the memory, perform a test on the obtained new learning data using the learned model, extract first learning data in which the labeled information is obtained with accuracy of a predetermined first reference value or higher as the test result, delete the extracted first learning data from the new learning data, and train again the learned model using the new learning data in which the extracted learning data is deleted.

The processor 102 may further include a random access memory (RAM, not illustrated) and a read-only memory (ROM, not illustrated) for temporarily and/or permanently storing signals (or data) processed therein. Further, the processor 102 may be implemented in the form of a system on chip (SoC) including at least one of the graphic processing unit, RAM, and ROM.

The memory 104 may store programs (one or more instructions) for processing and controlling the processor 102. Programs stored in the memory 104 may be divided into a plurality of modules according to functions.

Steps of a method or algorithm described in relation to an embodiment of the present invention may be implemented directly in hardware, be implemented in a software module executed by hardware, or be implemented by a combination thereof. The software module may reside in a random access memory (RAM), read only memory (ROM), erasable programmable ROM (EPROM), electrically erasable programmable ROM (EEPROM), flash memory, hard disk, removable disk, CD-ROM, or any type of computer-readable recording medium well known in the art to which the present invention pertains.

Components of the present invention may be implemented into a program (or application) so as to be executed by being combined with a computer, which is hardware to be stored in a medium. Components of the present invention may be implemented as software programming or software components, and similarly, embodiments include various algorithms implemented with a combination of data structures, processes, routines or other programming components to be implemented into a programming or scripting language such as C, C++, Java, and assembler. Functional aspects may be implemented into algorithm running on one or more processors.

Although embodiments of the present invention have been described with reference to the accompanying drawings, those skilled in the art to which the present invention pertains will understand that the present invention can be implemented in other specific forms without changing the technical spirit or essential characteristics. Therefore, it should be understood that the foregoing embodiments are not limited but are illustrative in all respects.

The invention claimed is:

1. A method of controlling a specialist platform by a blockchain holding server, the method comprising:
   registering a specialist;
   obtaining specialist information of the registered specialist;
   calculating career information of the specialist based on the obtained specialist information;
   matching a project corresponding to the specialist based on career information of the specialist,
   wherein the matching of a project comprises:
   obtaining project information;
   storing the project information and the specialist in a first blockchain and a second blockchain,
   storing, in the first blockchain, information obtained by hashing a node on the second blockchain in which the project information is stored,
   storing, in the second blockchain, information obtained by hashing a node on the first blockchain in which the project information is stored, thereby the first blockchain and the second blockchain are linked together,
doubly verifying the project information using the first blockchain and the second blockchain,
extracting career information required for executing the project from the obtained project information;
matching the specialist comprising the extracted career information;
obtaining project data calculated according to an execution result of the project when the matched project is executed by the specialist; and
updating, by the blockchain holding server, the career information of the specialist based on the project data for increasing an accuracy of a next project matching and for helping a work of specialists to use some of the generated project data in a next project,
wherein the calculating of career information comprises:
classifying the specialist information into structured information and unstructured information;
evaluating the structured information and the unstructured information; and
calculating career information of the specialist based on the evaluation result,
wherein the classifying of the specialist information comprises:
classifying specialist information corresponding to history information stored in a database into structured information based on the previously stored database; and
classifying the specialist information corresponding to history information not stored in the database and information on a specialty field not stored in the database into the unstructured information,
wherein the evaluating of the structured information comprises:
evaluating the structured information based on evaluation information stored in the database in a blockchain; and
estimating career information on the specialty field of the specialist from the unstructured information using a model learned to derive an association between the history information and specialty of each specialty field.

2. The method of claim 1, wherein the calculating of career information comprises:
calculating evaluation results for each of the specialist information;
obtaining a time point corresponding to each of the specialist information;
assigning a weight to the calculated evaluation result based on a period from a time point corresponding to each of the specialist information to the present; and
calculating career information of the specialist based on the weighted evaluation result,
wherein the assigning of a weight comprises:
obtaining information on a blank period included in the specialist information;
sorting the structured information, the unstructured information, and the blank period included in the specialist information in chronological order; and
assigning a weight to each of the sorted specialist information, wherein the weight is adjusted according to an evaluation result of one or more specialist information positioned behind each of the specialist information in time.

3. The method of claim 1, wherein the updating of the career information comprises:
generating feedback to career information of the specialist based on the project data;
evaluating an estimation result of the learned model based on the feedback; and
updating the learned model based on evaluation information on the estimation result,
wherein the updating of the learned model comprises:
storing, when an association between first unstructured information and first specialty field exceeds a preset reference value according to the result of updating the learned model, the first unstructured information in the database as structured information on the first specialty field; and
storing information on the first specialty field in the database, when information on the first specialty field is not stored in the database.

4. The method of claim 1, further comprising:
obtaining specialist information on each of the plurality of specialists;
generating a plurality of specialist pools based on the plurality of obtained specialist information;
obtaining a result of specialty evaluation of the specialist based on the specialist information; and
allocating the specialist to at least one specialist pool of the plurality of specialist pools based on the specialty evaluation result,
wherein the allocating of the specialist comprises:
allocating, when the specialty evaluation result is greater than or equal to a preset value, the specialist to a specialist pool corresponding to the specialty evaluation result; and
allocating, when a plurality of specialty evaluation results corresponding to a plurality of specialist pools are greater than or equal to a preset value, the specialist to the plurality of specialist pools according to a priority of the plurality of specialty evaluation results.

5. A device, comprising:
a memory for storing one or more instructions; and
a processor for executing the one or more instructions stored in the memory,
wherein the processor performs a method comprising:
register a specialist;
obtain specialist information of the registered specialist;
calculate career information of the specialist based on the obtained specialist information;
matching a project corresponding to the specialist based on career information of the specialist,
wherein the matching of a project comprises:
obtaining project information;
storing the project information and the specialist in a first blockchain and a second blockchain,
storing, in the first blockchain, information obtained by hashing a node on the second blockchain in which the project information is stored,
storing, in the second blockchain, information obtained by hashing a node on the first blockchain in which the project information is stored, thereby the first blockchain and the second blockchain are linked together,
doubly verifying the project information using the first blockchain and the second blockchain,
extracting career information required for executing the project from the obtained project information;
matching the specialist comprising the extracted career information;
obtaining project data calculated according to an execution result of the project when the matched project is executed by the specialist; and updating, by the blockchain holding server, the career information of the specialist based on the project data for increasing an accuracy of a next project matching and for helping a work of specialists to use some of the generated project data in a next project, wherein the calculating of career information comprises:

classifying the specialist information into structured information and unstructured information;

evaluating the structured information and the unstructured information; and calculating career information of the specialist based on the evaluation result, wherein the classifying of the specialist information comprises:

classifying specialist information corresponding to history information stored in a database into structured information based on the previously stored database; and classifying the specialist information corresponding to history information not stored in the database and information on a specialty field not stored in the database into the unstructured information, wherein the evaluating of the structured information comprises:

evaluating the structured information based on evaluation information stored in the database in a blockchain; and estimating career information on the specialty field of the specialist from the unstructured information using a model learned to derive an association between the history information and specialty of each specialty field.

6. A computer program stored in a recording medium combined with a computer as hardware and readable by a computer so as to perform a method comprising:

registering a specialist;

obtaining specialist information of the registered specialist;

calculating career information of the specialist based on the obtained specialist information;

matching a project corresponding to the specialist based on career information of the specialist, wherein the matching of a project comprises:

obtaining project information;

storing the project information and the specialist in a first blockchain and a second blockchain;

storing, in the first blockchain, information obtained by hashing a node on the second blockchain in which the project information is stored, storing, in the second blockchain, information obtained by hashing a node on the first blockchain in which the project information is stored, thereby the first blockchain and the second blockchain are linked together, doubly verifying the project information using the first blockchain and the second blockchain extracting career information required for executing the project from the obtained project information;

matching the specialist comprising the extracted career information;

obtaining project data calculated according to an execution result of the project when the matched project is executed by the specialist; and updating, by the blockchain holding server, the career information of the specialist based on the project data for increasing an accuracy of a next project matching and for helping a work of specialists to use some of the generated project data in a next project, wherein the calculating of career information comprises:

classifying the specialist information into structured information and unstructured information;

evaluating the structured information and the unstructured information; and calculating career information of the specialist based on the evaluation result, wherein the classifying of the specialist information comprises:

classifying specialist information corresponding to history information stored in a database into structured information based on the previously stored database; and classifying the specialist information corresponding to history information not stored in the database and information on a specialty field not stored in the database into the unstructured information, wherein the evaluating of the structured information comprises:

evaluating the structured information based on evaluation information stored in the database in a blockchain; and estimating career information on the specialty field of the specialist from the unstructured information using a model learned to derive an association between the history information and specialty of each specialty field.

* * * * *